US012596694B2

(12) United States Patent (10) Patent No.: US 12,596,694 B2
Meduri (45) Date of Patent: *Apr. 7, 2026

(54) COLLABORATIVE AUTOMATED SYSTEM FOR INTELLIGENT STORAGE FORECASTING AND ABEND HANDLING

(71) Applicant: Bank of America Corporation, Charlotte, NC (US)

(72) Inventor: Karthikeya Venkata Sastry Meduri, Tamil Nadu (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/891,083

(22) Filed: Sep. 20, 2024

(65) Prior Publication Data

US 2025/0028697 A1 Jan. 23, 2025

Related U.S. Application Data

(63) Continuation of application No. 18/224,841, filed on Jul. 21, 2023, now Pat. No. 12,210,499.

(51) Int. Cl.
*G06F 16/21* (2019.01)
*G06F 16/27* (2019.01)

(52) U.S. Cl.
CPC ............ *G06F 16/219* (2019.01); *G06F 16/27* (2019.01)

(58) Field of Classification Search
None
See application file for complete search history.

(56) References Cited

U.S. PATENT DOCUMENTS 6,983,362 B1 * 1/2006 Kidder ................ G06F 11/0709
713/1
6,990,628 B1 * 1/2006 Palmer .................... G06F 16/10
707/999.006

(Continued)

OTHER PUBLICATIONS

Agnihotri et al., "A Review on Fault Tolerance in Cloud Computing," Section A Research Paper, Eur. Chem. Bull. 2023, 12 (1), 2183-2195, 13 pages.

(Continued)

*Primary Examiner* — Eliyah S. Harper
(74) *Attorney, Agent, or Firm* — Banner & Witcoff, Ltd.

(57) ABSTRACT

Aspects of the disclosure relate to using machine learning models to automatically deallocating overallocated database storage. A computing system may retrieve database state data that indicates current states of databases. Further, the computing system may retrieve average storage usage thresholds and peak storage usage threshold for the databases. The average storage threshold for the databases may indicate an average amount of storage used by each database. The peak storage usage threshold for the databases may indicate an amount of storage that is allocatable without causing an abnormal termination. Based on inputting the database state data, the average storage usage threshold, and the peak storage usage threshold into the machine learning models, an amount of overallocated storage of the databases may be determined. Further, the overallocated storage may be deallocated from the databases based on configurations of each of the databases.

20 Claims, 11 Drawing Sheets

(56) References Cited

U.S. PATENT DOCUMENTS

| | | | | |
|---|---|---|---|---|
| 7,370,235 | B1 * | 5/2008 | Gulve | G06F 11/201 |
| | | | | 711/162 |
| 7,555,547 | B2 * | 6/2009 | Singh | H04L 69/329 |
| | | | | 709/224 |
| 8,276,065 | B2 * | 9/2012 | Huang | G06F 16/38 |
| | | | | 715/254 |
| 8,924,340 | B2 * | 12/2014 | Cui | G06F 16/90344 |
| | | | | 706/59 |
| 8,924,589 | B2 * | 12/2014 | Thiel | G06Q 10/107 |
| | | | | 709/239 |
| 9,185,164 | B1 * | 11/2015 | Newhouse | H04L 67/5682 |
| 9,356,793 | B1 * | 5/2016 | Drobychev | H04L 67/01 |
| 9,361,349 | B1 * | 6/2016 | Newhouse | H04L 67/1097 |
| 9,514,170 | B1 * | 12/2016 | Tillotson | G06F 9/546 |
| 9,524,312 | B2 * | 12/2016 | Durai | G06F 16/2322 |
| 10,387,389 | B2 * | 8/2019 | Kabra | G06F 16/2365 |
| 10,409,697 | B2 | 9/2019 | Chen et al. | |
| 10,445,062 | B2 * | 10/2019 | Oberbreckling | G06F 7/02 |
| 10,606,869 | B2 * | 3/2020 | Poteet | G06F 16/30 |
| 10,692,015 | B2 * | 6/2020 | Xu | G06N 20/20 |
| 10,977,132 | B2 | 4/2021 | Deshpande et al. | |
| 11,010,356 | B2 | 5/2021 | Hapse et al. | |
| 11,567,976 | B2 * | 1/2023 | Rout | G06F 16/288 |
| 2007/0124348 | A1 * | 5/2007 | Claborn | G06F 11/2025 |
| 2007/0198797 | A1 * | 8/2007 | Kavuri | H04L 67/1097 |
| | | | | 711/170 |
| 2009/0063501 | A1 * | 3/2009 | Buckler | G06F 11/2025 |
| 2011/0010518 | A1 * | 1/2011 | Kavuri | G06F 9/50 |
| | | | | 711/170 |
| 2011/0196900 | A1 * | 8/2011 | Drobychev | G06F 16/122 |
| | | | | 707/812 |
| 2013/0110966 | A1 | 5/2013 | Nagami et al. | |
| 2015/0113147 | A1 | 4/2015 | Martini | |
| 2016/0092476 | A1 * | 3/2016 | Stojanovic | G06F 3/04883 |
| | | | | 707/805 |
| 2016/0203062 | A1 * | 7/2016 | Hapse | G06F 11/0793 |
| | | | | 714/15 |
| 2016/0226970 | A1 * | 8/2016 | Newhouse | G06F 16/178 |
| 2016/0321340 | A1 * | 11/2016 | Newhouse | G06F 16/178 |
| 2016/0364404 | A1 * | 12/2016 | Newhouse | G06F 16/27 |
| 2017/0169529 | A1 * | 6/2017 | Delaney | H04L 41/0826 |
| 2017/0308598 | A1 * | 10/2017 | Goldberg | G06F 16/23 |
| 2017/0308599 | A1 * | 10/2017 | Newhouse | G06F 16/2308 |
| 2017/0308600 | A1 * | 10/2017 | Goldberg | G06F 16/178 |
| 2018/0089278 | A1 * | 3/2018 | Bhattacharjee | H04L 43/12 |
| 2018/0253468 | A1 * | 9/2018 | Gurajada | G06F 16/2255 |
| 2019/0272331 | A1 * | 9/2019 | Gangadhar | H04L 41/0897 |
| 2020/0042392 | A1 * | 2/2020 | Alluboyina | G06F 16/27 |
| 2020/0379803 | A1 | 12/2020 | Saillet et al. | |
| 2021/0064431 | A1 | 3/2021 | Smith et al. | |
| 2022/0382651 | A1 * | 12/2022 | Lu | G06F 11/1471 |

OTHER PUBLICATIONS

Singh et al., "Replication of Data in Database Systems for Backup and Failover—An Overview," International Journal of Computer and Communication Engineering, vol. 2, No. 4, Jul. 2013, 4 pages.

Grust et al., "Modern techniques for transaction-oriented database recovery," Datenbanksysteme für Business, Technologie und Web (BTW 2019), Lecture Notes in Informatics (LNI), Gesellschaft für Informatik, Bonn 2019, 10 pages.

Avinash Ganne, "High Availability and Disaster Recovery in Azure for Kubernetes," International Research Journal of Modernization in Engineering Technology and Science, vol. 05/Issue:01/Jan. 2023, 5 pages.

Joonas Ryynänen, "Relational Database Clustering with MariaDB Galera," Bachelor of Business Administration, Business Information Technology, Autumn 2019, KAMK University of Applied Sciences, 10 pages.

Jul. 3, 2024—(US) Notice of Allowance—U.S. Appl. No. 18/224,841.

Aug. 30, 2024—(US) Notice of Allowance—U.S. Appl. No. 18/224,815.

* cited by examiner

100

600

Figure 7:
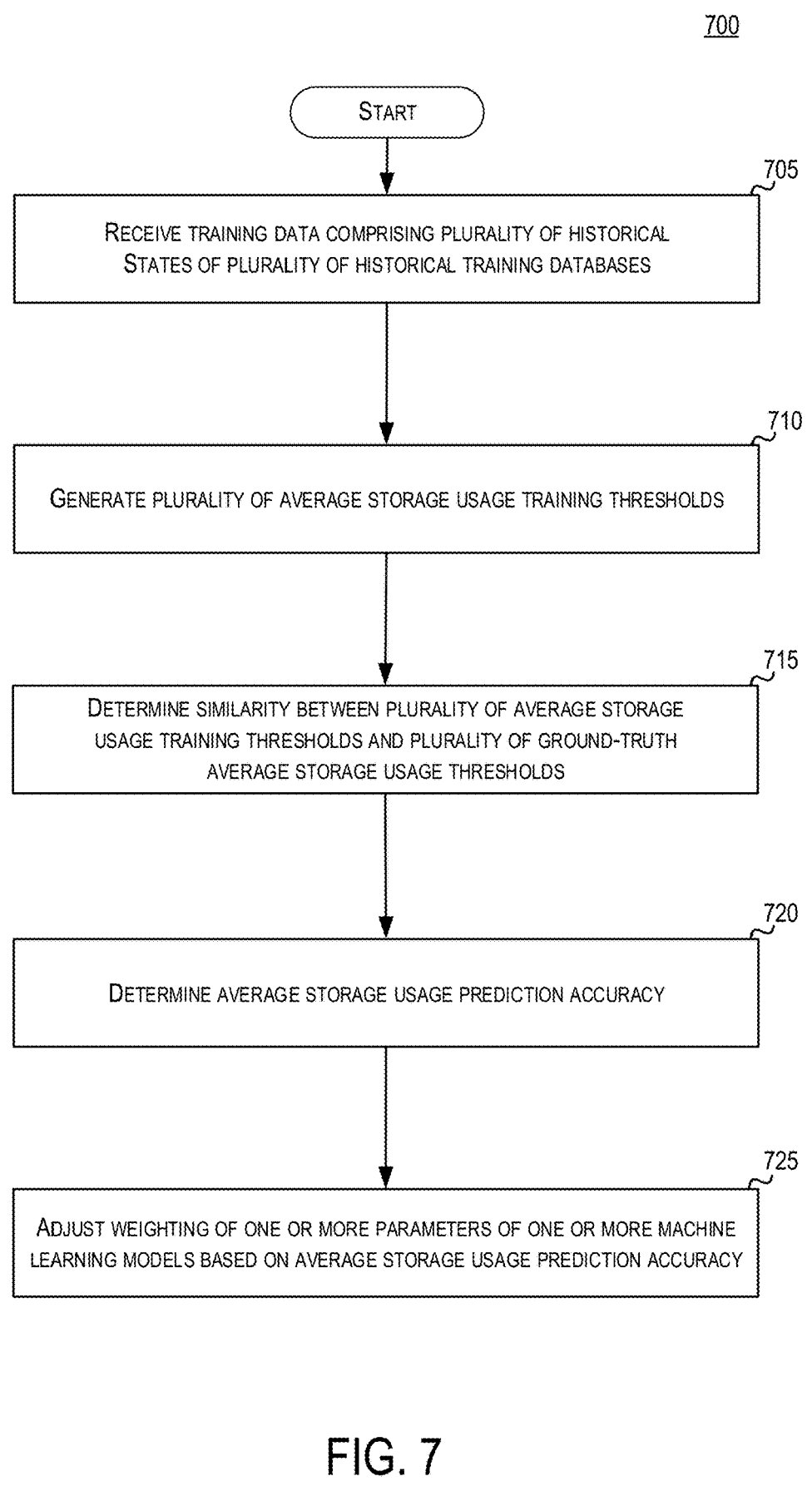

700

START

705

RECEIVE TRAINING DATA COMPRISING PLURALITY OF HISTORICAL STATES OF PLURALITY OF HISTORICAL TRAINING DATABASES

710

GENERATE PLURALITY OF AVERAGE STORAGE USAGE TRAINING THRESHOLDS

715

DETERMINE SIMILARITY BETWEEN PLURALITY OF AVERAGE STORAGE USAGE TRAINING THRESHOLDS AND PLURALITY OF GROUND-TRUTH AVERAGE STORAGE USAGE THRESHOLDS

720

DETERMINE AVERAGE STORAGE USAGE PREDICTION ACCURACY

725

ADJUST WEIGHTING OF ONE OR MORE PARAMETERS OF ONE OR MORE MACHINE LEARNING MODELS BASED ON AVERAGE STORAGE USAGE PREDICTION ACCURACY

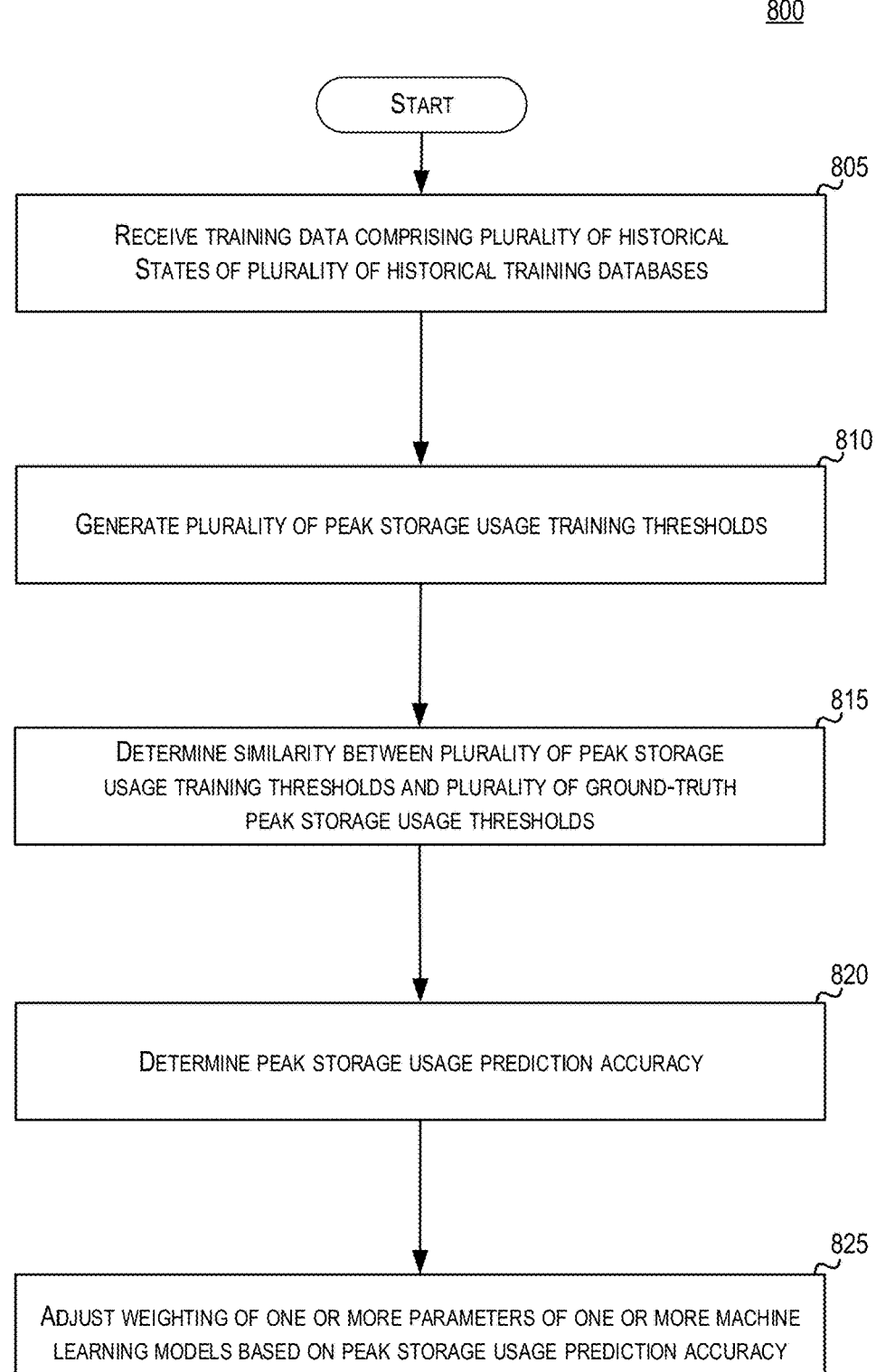

START

805

RECEIVE TRAINING DATA COMPRISING PLURALITY OF HISTORICAL STATES OF PLURALITY OF HISTORICAL TRAINING DATABASES

810

GENERATE PLURALITY OF PEAK STORAGE USAGE TRAINING THRESHOLDS

815

DETERMINE SIMILARITY BETWEEN PLURALITY OF PEAK STORAGE USAGE TRAINING THRESHOLDS AND PLURALITY OF GROUND-TRUTH PEAK STORAGE USAGE THRESHOLDS

820

DETERMINE PEAK STORAGE USAGE PREDICTION ACCURACY

825

ADJUST WEIGHTING OF ONE OR MORE PARAMETERS OF ONE OR MORE MACHINE LEARNING MODELS BASED ON PEAK STORAGE USAGE PREDICTION ACCURACY

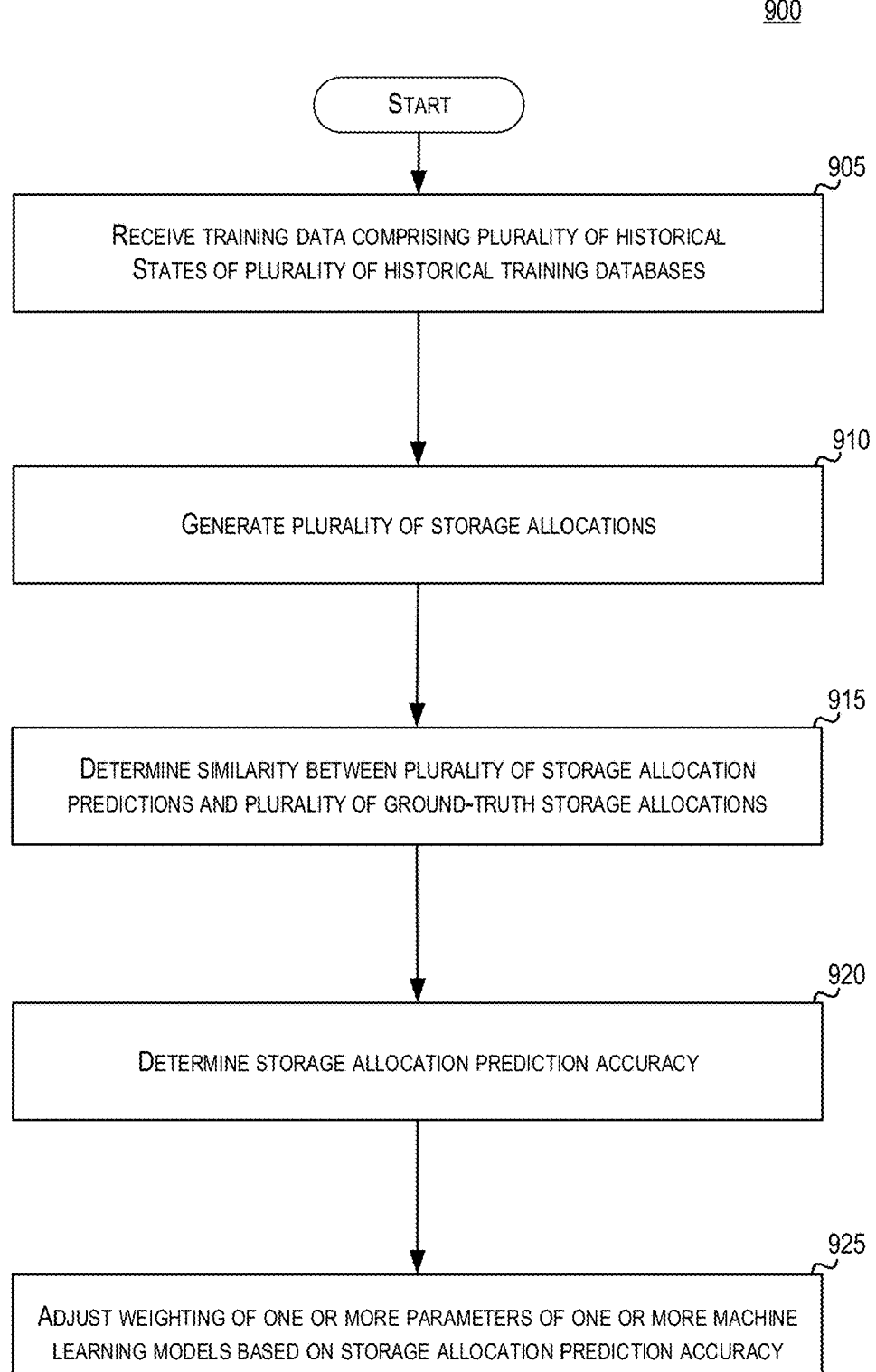

START

905
RECEIVE TRAINING DATA COMPRISING PLURALITY OF HISTORICAL STATES OF PLURALITY OF HISTORICAL TRAINING DATABASES

910
GENERATE PLURALITY OF STORAGE ALLOCATIONS

915
DETERMINE SIMILARITY BETWEEN PLURALITY OF STORAGE ALLOCATION PREDICTIONS AND PLURALITY OF GROUND-TRUTH STORAGE ALLOCATIONS

920
DETERMINE STORAGE ALLOCATION PREDICTION ACCURACY

925
ADJUST WEIGHTING OF ONE OR MORE PARAMETERS OF ONE OR MORE MACHINE LEARNING MODELS BASED ON STORAGE ALLOCATION PREDICTION ACCURACY

Figure 10:
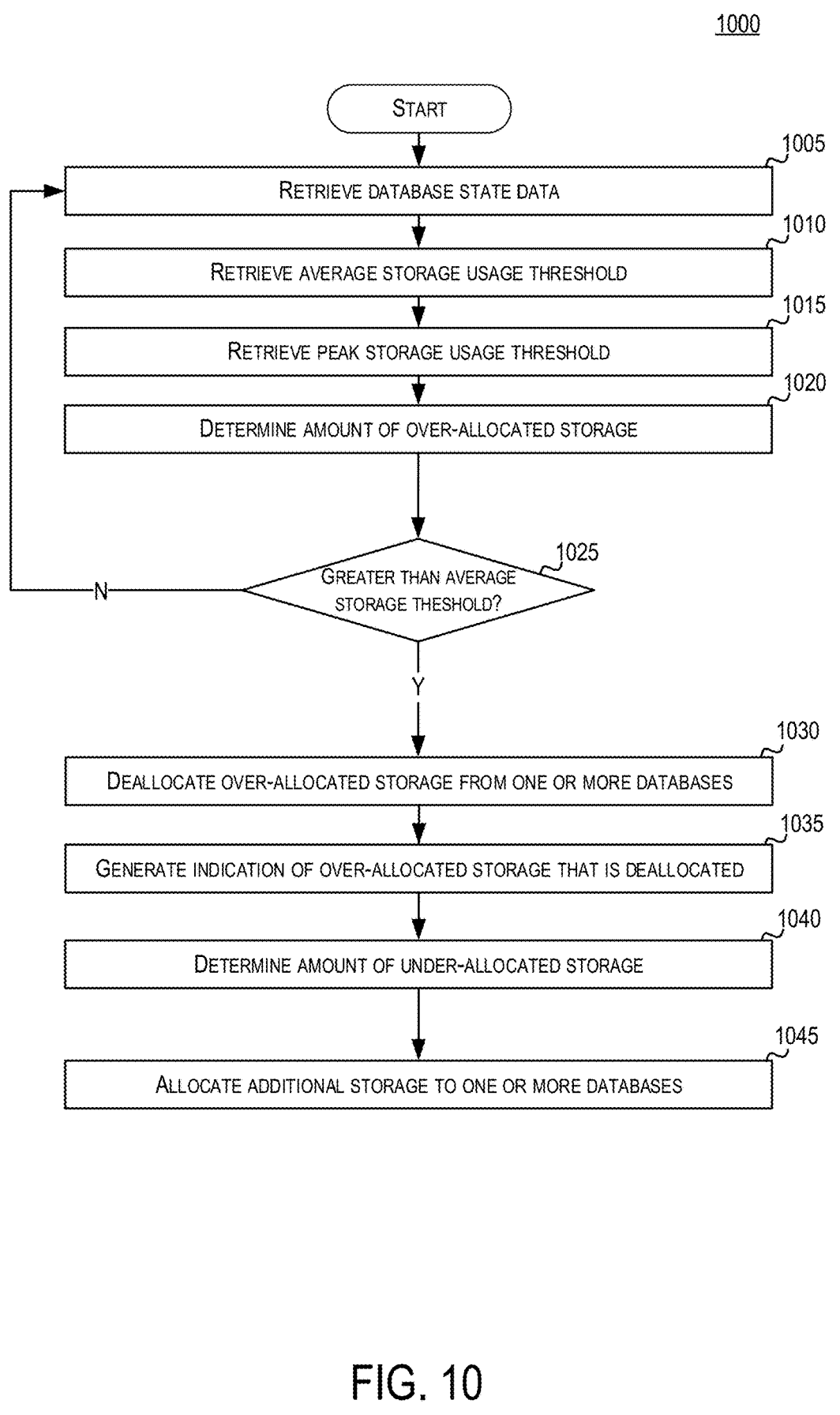

START

RETRIEVE DATABASE STATE DATA — 1005

RETRIEVE AVERAGE STORAGE USAGE THRESHOLD — 1010

RETRIEVE PEAK STORAGE USAGE THRESHOLD — 1015

DETERMINE AMOUNT OF OVER-ALLOCATED STORAGE — 1020

GREATER THAN AVERAGE STORAGE THESHOLD? — 1025

N

Y

DEALLOCATE OVER-ALLOCATED STORAGE FROM ONE OR MORE DATABASES — 1030

GENERATE INDICATION OF OVER-ALLOCATED STORAGE THAT IS DEALLOCATED — 1035

DETERMINE AMOUNT OF UNDER-ALLOCATED STORAGE — 1040

ALLOCATE ADDITIONAL STORAGE TO ONE OR MORE DATABASES — 1045

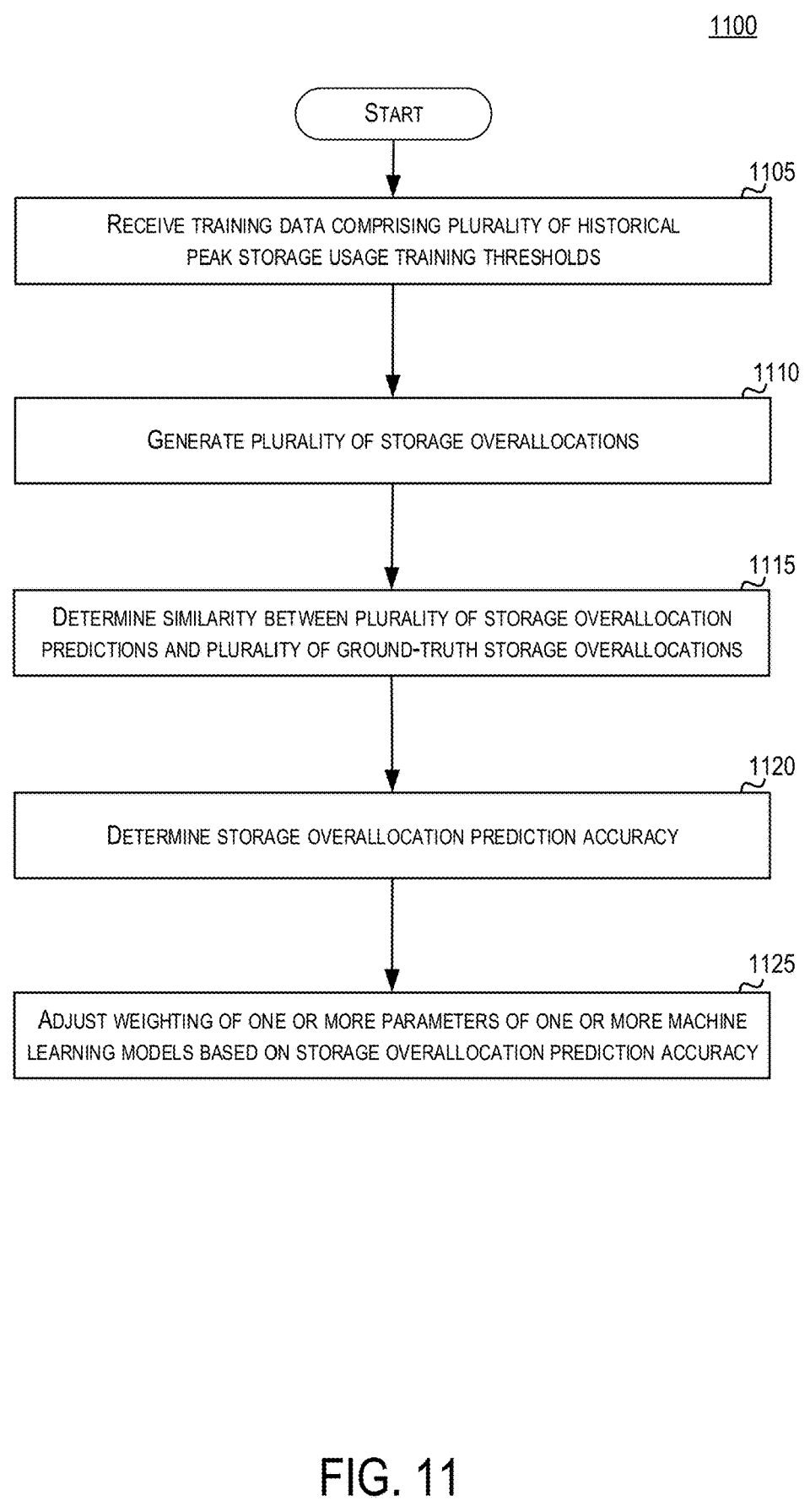

START

1105

RECEIVE TRAINING DATA COMPRISING PLURALITY OF HISTORICAL PEAK STORAGE USAGE TRAINING THRESHOLDS

1110

GENERATE PLURALITY OF STORAGE OVERALLOCATIONS

1115

DETERMINE SIMILARITY BETWEEN PLURALITY OF STORAGE OVERALLOCATION PREDICTIONS AND PLURALITY OF GROUND-TRUTH STORAGE OVERALLOCATIONS

1120

DETERMINE STORAGE OVERALLOCATION PREDICTION ACCURACY

1125

ADJUST WEIGHTING OF ONE OR MORE PARAMETERS OF ONE OR MORE MACHINE LEARNING MODELS BASED ON STORAGE OVERALLOCATION PREDICTION ACCURACY

FIG. 11

COLLABORATIVE AUTOMATED SYSTEM FOR INTELLIGENT STORAGE FORECASTING AND ABEND HANDLING

CROSS REFERENCE TO RELATED APPLICATIONS

This application is a continuation of and claims priority to co-pending U.S. application Ser. No. 18/224,841, filed Jul. 21, 2023, and entitled, "Collaborative Automated System for Intelligent Storage Forecasting and Abend Handling," which is incorporated by reference herein in its entirety.

TECHNICAL FIELD

Some aspects of the disclosure relate to automatically forecasting an amount of storage to use for storage devices and/or calculating an amount of storage to allocate or deallocate in order to maintain normal operation of storage devices. Other aspects of the disclosure relate to the automatic intake and processing of data that may be evaluated using machine learning models that are configured to forecast storage requirements in order to prevent abnormal termination of a database, allocate storage to prevent abnormal termination of a database, and/or deallocate storage to allow for more efficient use of storage resources.

BACKGROUND

Data loads in a production environment may vary from moment to moment and cause sudden or unexpected surges in incoming data that a database system may be incapable of handing due to insufficient storage. The result of such surges may be database system failure, which may cause data loss and/or a slowdown in the operation of the production environment due to the time required to resume normal operation of the database and/or recover lost data. Such failures may be more likely to occur when a sufficient amount of storage was not allocated to the database system. Additionally, as the storage requirements of a database may vary depending on the circumstances, a situation may arise in which the amount of storage used by a database may exceed the actual requirements of the database, thereby resulting in excessive use of storage resources.

Further, the management of databases may be arduous and require significant amounts of computational resources as well as manual intervention on the part of database administrators and other personnel charged with operating a database system. Excessive use of computational resources and excessive manual intervention due to may result in unnecessary costs and expenditure of time that may reduce the resources that could otherwise be invested in other areas. As a result, attempting to accurately evaluate the amount of storage that is required to operate a database may present challenges.

SUMMARY

Aspects of the disclosure provide technical solutions to improve the effectiveness with which an amount of storage to allocate to a database may be forecasted. Further, aspects of the disclosure may be used to improve the deallocation of overallocated storage (e.g., excess storage) used by a database and/or the allocation of storage to a database that is not sufficiently provisioned.

In accordance with one or more embodiments of the disclosure, a computing system may comprise one or more processors and memory storing computer-readable instructions that, when executed by the one or more processors, may cause the computing system to retrieve database state data comprising an indication of a state of each of one or more databases. The computing system may determine, based on inputting the database state data into one or more machine learning models, an average storage usage threshold for each of the one or more databases. The average storage threshold for each of the one or more databases may indicate an average amount of storage used by each of the one or more databases. The computing system may determine, based on inputting the database state data into the one or more machine learning models, a peak storage usage threshold for each of the one or more databases. The peak storage usage threshold for each of the one or more databases may indicate an amount of storage that is allocatable without causing an abnormal termination. The computing system may determine, based on inputting the database state data, the one or more average storage usage thresholds, and the one or more peak storage usage thresholds into the one or more machine learning models, a forecasted amount of additional storage to allocate to each of the one or more databases in order to prevent the abnormal termination of the one or more databases. Furthermore, the computing system may allocate, from a reserve storage device, the additional storage to each of the one or more databases.

In one or more implementations, the memory may store additional computer-readable instructions that, when executed by the one or more processors, further cause the computing system to access training data comprising a plurality of historical states of a plurality of training databases. The computing system may generate, based on inputting the training data into the one or more machine learning models, a plurality of average storage usage training thresholds. The computing system may determine a similarity between the plurality of average storage usage training thresholds and a plurality of ground-truth average storage usage thresholds. The computing system may generate, based on the similarity between the plurality of average storage usage training thresholds and the plurality of ground-truth average storage usage thresholds, an average storage usage threshold prediction accuracy of the one or more machine learning models. The computing system may adjust a weighting of one or more average storage usage parameters of the one or more machine learning models based on the average storage usage threshold prediction accuracy. The weighting of the one or more average storage usage parameters that increase the average storage usage threshold prediction accuracy may be increased. The weighting of the one or more average storage usage parameters that decrease the average storage usage threshold prediction accuracy may be decreased.

In one or more implementations, the average storage usage threshold prediction accuracy may be based on an amount of similarities between the plurality of average storage usage thresholds and the ground-truth storage overallocations.

In one or more implementations, the memory may store additional computer-readable instructions that, when executed by the one or more processors, further cause the computing system to access training data comprising a plurality of historical states of a plurality of training databases. The computing system may generate, based on inputting the training data into the one or more machine learning models, a plurality of peak storage usage training thresholds. The computing system may determine a similarity between the plurality of peak storage usage training thresholds and a plurality of ground-truth peak storage usage thresholds. The computing system may generate, based on the similarity between the plurality of peak storage usage training thresholds and the plurality of ground-truth storage usage thresholds, a peak storage usage threshold prediction accuracy of the one or more machine learning models. The computing system may adjust a weighting of one or more peak storage usage parameters of the one or more machine learning models based on the peak storage usage threshold prediction accuracy. The weighting of the one or more peak storage usage parameters that increase the peak storage usage threshold prediction accuracy may be increased. The weighting of the one or more peak storage usage parameters that decrease the peak storage usage threshold prediction accuracy may be decreased.

In one or more implementations, the peak storage usage threshold prediction accuracy may be based on an amount of similarities between the plurality of peak storage usage thresholds and the ground-truth storage overallocations.

In one or more implementations, the memory may store additional computer-readable instructions that, when executed by the one or more processors, further cause the computing system to access training data comprising a plurality of historical states of a plurality of training databases, wherein the plurality of historical states comprise historical average storage usage thresholds and historical peak storage usage thresholds. The computing system may generate, based on inputting the training data into the one or more machine learning models, a plurality of storage allocations. The computing system may determine a similarity between the plurality of storage allocations and a plurality of ground-truth storage allocations. The computing system may generate, based on the similarity between the plurality of storage allocations and the plurality of ground-truth storage allocations, a storage allocation prediction accuracy of the one or more machine learning models. The computing system may adjust a weighting of one or more storage allocation parameters of the one or more machine learning models based on the storage allocation prediction accuracy. The weighting of the one or more storage allocation parameters that increase the storage allocation prediction accuracy may be increased. The weighting of the one or more storage allocation parameters that decrease the storage allocation prediction accuracy may be decreased.

In one or more implementations, the storage allocation prediction accuracy may be based on an amount of similarities between the plurality of storage allocation predictions and the ground-truth storage allocations.

In one or more implementations, the database state data may comprise an indication of an amount of data currently used by each of the one or more databases and/or an amount of data previously used by each of the one or more databases.

In one or more implementations, the one or more databases may be stored in one or more storage devices comprising a reserve storage device.

In one or more implementations, the allocating, from the reserve storage device, the additional storage to each of the one or more databases may be based on the reserve storage device being provisioned with the additional amount of storage.

In one or more implementations, the memory may store additional computer-readable instructions that, when executed by the one or more processors, further cause the computing system to deallocate the additional storage from the reserve storage device.

In one or more implementations, the reserve storage device may be remote from one or more storage devices that store the one or more databases.

In one or more implementations, the one or more machine learning models may be configured to determine an average reserve storage threshold for the reserve storage device.

In one or more implementations, the one or more machine learning models may be configured to determine a peak reserve storage threshold for the reserve storage device.

In one or more implementations, the one or more databases may be part of a relational database management system (RDBMS), a non-relational database management system, a hierarchical database management system, and/or an object oriented database management system.

In accordance with one or more embodiments of the disclosure, a computing system may comprise one or more processors and memory storing computer-readable instructions that, when executed by the one or more processors, may cause the computing system to retrieve database state data comprising an indication of a state of each of one or more databases. The database state data comprises an indication of an amount of data currently used by each of the one or more databases. The computing system may retrieve an average storage usage threshold for each of the one or more databases. The average storage usage threshold for each of the one or more databases indicates an average amount of storage used by each of the one or more databases. The computing system may retrieve a peak storage usage threshold for each of the one or more databases. The peak storage usage threshold for each of the one or more databases indicates an amount of storage that is allocatable without causing an abnormal termination. The computing system may determine, based on inputting the database state data, the average storage usage threshold, and the peak storage usage threshold, into one or more machine learning models, an amount of overallocated storage to deallocate from each of the one or more databases. The computing system may deallocate the overallocated storage from each of the one or more databases.

In one or more implementations, the memory may store additional computer-readable instructions that, when executed by the one or more processors, further cause the computing system to determine, based on inputting the database state data, the average storage usage threshold, and the peak storage usage threshold, into one or more machine learning models, an amount of underallocated storage for each of the one or more databases. The amount of underallocated storage may comprise an amount of data within a predetermined amount of the peak storage usage threshold for each of the one or more databases. The computing system may determine, based on inputting the amount of underallocated data into the one or more machine learning models, a forecasted amount of additional storage to add to each of the one or more databases. Further, the computing system may allocate the additional storage to each of the one or more databases. An amount of the additional storage to allocate to each of the one or more databases may be based on a configuration of the one or more databases.

In one or more implementations, the memory may store additional computer-readable instructions that, when executed by the one or more processors, may further cause the computing system to reduce the amount of overallocated storage to deallocate from each of the one or more databases by a predetermined buffer amount. The predetermined buffer amount may comprise a fixed amount of storage or is a proportion of the amount of overallocated storage to deallocate.

In one or more implementations, the additional storage may be allocated from a reserve storage device.

In one or more implementations, the amount of the additional storage to allocate to each of the one or more databases may be less than or equal to the peak storage usage threshold of each of the one or more databases.

In one or more implementations, the memory may store additional computer-readable instructions that, when executed by the one or more processors, further cause the computing system to access training data comprising a plurality of historical states of a plurality of training databases. The plurality of historical states may comprise historical average storage usage training thresholds and historical peak storage usage training thresholds. The computing system may generate, based on inputting the training data into the one or more machine learning models, a plurality of storage overallocation predictions. The computing system may determine a similarity between the plurality of storage overallocation predictions and a plurality of ground-truth storage overallocations. The computing system may generate, based on the similarity between the plurality of storage overallocation predictions and the plurality of ground-truth storage overallocations, a storage overallocation prediction accuracy of the one or more machine learning models. The computing system may adjust a weighting of one or more storage overallocation parameters of the one or more machine learning models based on the storage overallocation prediction accuracy. The weighting of the one or more storage overallocation parameters that increase the storage overallocation prediction accuracy may be increased. The weighting of the one or more storage overallocation parameters that decrease the storage overallocation prediction accuracy may be decreased.

In one or more implementations, the storage overallocation prediction accuracy may be based on an amount of similarities between the plurality of storage overallocation predictions and the ground-truth storage overallocations.

In one or more implementations, the memory may store additional computer-readable instructions that, when executed by the one or more processors, further cause the computing system to generate an indication of the overallocated storage that may be deallocated from each of the one or more databases.

In one or more implementations, the storage used by the one or more databases is allocated from a reserve storage device.

In one or more implementations, the one or more databases may be stored in one or more storage devices comprising the reserve storage device.

In one or more implementations, the peak storage usage threshold may be greater than the average storage usage threshold.

In one or more implementations, the memory may store additional computer-readable instructions that, when executed by the one or more processors, further cause the computing system to determine, based on inputting the database state data into the one or more machine learning models, the average storage usage threshold for each of the one or more databases.

In one or more implementations, the memory may store additional computer-readable instructions that, when executed by the one or more processors, further cause the computing system to determine, based on inputting the database state data into the one or more machine learning models, the peak storage usage threshold for each of the one or more databases.

In one or more implementations, the memory may store additional computer-readable instructions that, when executed by the one or more processors, further cause the computing system to determine that the amount of the overallocated storage to deallocate from each of the one or more databases causes the amount of storage allocated to the one or more databases to be greater than or equal to the average storage usage threshold.

Corresponding methods (e.g., computer-implemented methods), apparatuses, devices, systems, and/or computer-readable media (e.g., non-transitory computer readable media) are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 7 depicts an illustrative method for automatically training a machine learning model to generate an average threshold prediction accuracy in accordance with one or more aspects of the disclosure;

FIG. 8 depicts an illustrative method for automatically training a machine learning model to generate a peak storage usage threshold prediction accuracy in accordance with one or more aspects of the disclosure;

FIG. 9 depicts an illustrative method for automatically training a machine learning model to generate a storage allocation prediction accuracy in accordance with one or more aspects of the disclosure;

FIG. 10 depicts an illustrative method for automatically reallocating storage used by databases in accordance with one or more aspects of the disclosure; and FIG. 11 depicts an illustrative method for automatically training a machine learning model to reallocate storage in accordance with one or more aspects of the disclosure.

DETAILED DESCRIPTION

Figure 1:
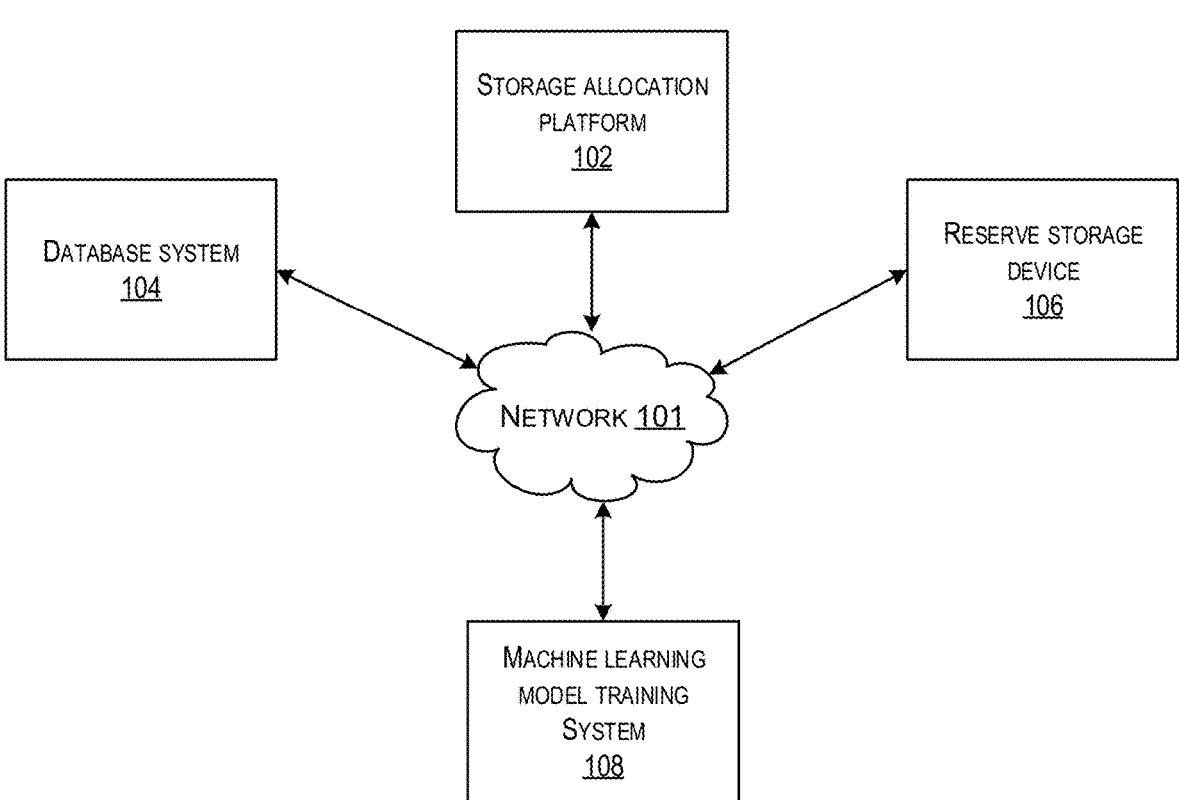
FIG. 1 depicts an illustrative computing environment for automated storage forecasting, allocation, and/or deallocation in accordance with one or more aspects of the disclosure.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Aspects of the disclosed technology may relate to devices, systems, non-transitory computer readable media, and/or methods for allocating and/or deallocating storage to one or more databases. The disclosed technology may leverage artificial intelligence (e.g., machine learning models) to forecast an amount of storage to allocate to a database and perform operations to allocate the amount of storage that was determined. Further, the disclosed technology may analyze databases, determine an excess amount of storage that is being used by the databases, and deallocate the excess storage. The deallocated storage reclaimed from the databases may then be allocated to a reserve storage device that may be used to allocated the deallocated storage to other databases that may require storage. The use of these techniques may result in a variety of benefits and advantages including a reduction in the time used to allocate and/or deallocate storage of the database and/or more efficient use of computational resources achieved through use of machine learning models. Additionally, the allocation and/or deallocation of storage to databases may be based on average storage usage thresholds and/or peak storage usage thresholds that may be used to ensure that an adequate amount of storage is allocated to databases. The use of storage usage thresholds allows for a more customized allocation and/or deallocation of storage for databases.

When a database has not been allocated a sufficient amount of storage the database may abnormally terminate due to the database requiring additional storage beyond the amount that was allocated. Abnormal termination of the database may result in data loss and loss of time to attempt to recover lost data, allocate additional storage to meet the storage requirements of the database, and/or resume operation of the database. To address the issue of abnormal termination of a database and other issues, the disclosed technology may provide an artificial intelligence (e.g., machine learning model) algorithm based forecasting process that may be used to improve the allocation and/or deallocation of storage for one or more databases and thereby avoid abnormal termination of the database.

The artificial intelligence algorithm may leverage machine learning models that are trained to forecast an amount of storage to allocate to a database based on a variety of factors including the current state of the database, past states of the database, the date, the time of day, the type of data stored in the database, amounts of storage allocated to similar databases, the types of applications that access the database, average storage usage thresholds (e.g., averages amounts of storage allocated to the database in the past) for the database, a threshold rate at which data is written to the database, and/or peak storage usage thresholds (e.g., peak amounts of storage allocated to the database in the past) for the database. For example, the current state of a database may comprise a current storage allocation for the database as well as a rate at which data is being written to the database. A current storage allocation that is greater than an average storage usage threshold may be positively correlated with a forecasted amount of additional storage that is greater than average. Further, data being written to the database at greater than a threshold rate for the database may also be positively correlated with a forecasted amount of additional storage that is greater than average. The forecasted amount of additional storage to allocate to a database may be based on a forecast or prediction of the state of the database at some time in the future. The time in the future may coincide with certain events that may be associated with greater storage allocations. For example, the forecasted amount of additional storage may be based on an upcoming holiday during which a greater amount of data is written to a database and a greater storage allocate is required to keep the database from terminating abnormally or otherwise experiencing a reduction in performance.

The disclosed technology may also base a forecasted amount of additional storage to allocate on the types of applications that use the database. For example, a government banking application that keeps track of financial transactions may require a forecasted amount of additional storage that is greater than that of another application that accesses a database that stores less important information. As a result, the forecasted amount of additional storage may be positively correlated with the importance of the data being stored by the database. Further, the forecasted amount of additional storage to allocate to a database may be based on the amount of storage that is allocated to similar databases. For example, another database that stores similar types of data and/or is accessed by similar types of applications may be used as a basis for the determination of the additional amount of storage to allocate to the database. In some embodiments, the disclosed technology may be configured and/or trained to extrapolate the amount of storage to allocate to a database based on the storage allocations of a similar type of database that may be smaller or larger in size. For example, the forecasted amount of additional storage to allocate to a mid-sized database may be proportionally smaller (e.g., half the size) than that of a similar but larger (e.g., twice as large) database that stores similar data and/or is accessed by the same application or type of application.

The machine learning models in the disclosed technology may be configured and/or trained to forecast an amount of storage (e.g., an additional amount of storage) to allocate to a database based on some combination of supervised and/or unsupervised learning. For example, the machine learning models may be trained using training data that includes historical states of databases some of which may have terminated abnormally (e.g., stopped functioning properly due to inadequate storage). As part of training the machine learning models may receive historical states of the databases as input and generate a forecasted amount of storage to allocate to the databases. If the forecasted amount of storage is less than the amount that resulted in abnormal termination of the database and/or an amount that would have been sufficient to prevent the abnormal termination, the machine learning models may be retrained until the forecasted amount of storage is sufficient to prevent abnormal termination of the database. Further, the machine learning models may be trained not to exceed the sufficient amount of storage by greater than some buffer amount of storage. For example, the machine learning models may be trained not to exceed the forecasted amount of storage to allocate by more than five or ten percent. The buffer amount of storage may be adjusted based on the availability of storage and/or the importance of the database (e.g., databases that store critical data may have a larger buffer amount of storage).

The disclosed technology may retrieve database state data that includes an indication of a state of each of one or more databases. For example, a computing system may access database data from a database or other computing device, and based on the database state data may determine an amount of storage currently allocated to the database as well as previous amounts of storage allocated to the database and instances in which the database abnormally terminated due to an insufficient allocation of storage. Based on inputting the database state data into one or more machine learning models, an average storage usage threshold for each of the one or more databases may be determined. The average storage threshold for each of the one or more databases may indicate an average amount of storage used or likely to be used by each of the one or more databases. Further, the average storage usage threshold of a database may be based on an analysis of previous states of the database and may be used to determine an average amount of storage allocated to the database that is less likely to result in abnormal termination of the database (e.g., a mean or median amount of storage allocation that is less likely to result in abnormal termination of a database).

Based on inputting the database state data into the one or more machine learning models, a peak storage usage threshold for each of the one or more databases may be determined. The peak storage usage threshold for each of the one or more databases may indicate an amount of storage that may be allocated to each database without causing an abnormal termination of the database. In some embodiments, the peak storage usage threshold may comprise a maximum amount of storage that may be allocated to a database, a predetermined amount of storage above the average storage usage threshold, and/or some portion (e.g., ninety percent) of the maximum amount of storage that may be allocated to a database. Further, the peak storage usage threshold may be based on an amount of storage that is available in a reserve storage device from which storage may be allocated to the one or more databases.

Based on inputting the database state data, the one or more average storage usage thresholds, and/or the one or more peak storage usage thresholds into the one or more machine learning models, a forecasted amount of additional storage to allocate to each of the one or more databases in order to prevent the abnormal termination of the one or more databases may be determined. The amount of storage to allocate to each of the one or more databases may be based on an amount storage that is available in a reserve storage device from which storage may be allocated to the one or more databases. Furthermore, after determining an amount of storage to allocate to the one or more databases, the additional storage may be allocated, from a reserve storage device, to each of the one or more databases.

Further, the disclosed technology may be used to more optimally allocate storage for databases by deallocating excessive storage that was allocated to the databases. Deallocation of storage that is less likely to be used may free up storage for other databases and/or other applications. In particular, the disclosed technology may retrieve database state data comprising an indication of a state of each of one or more databases. For example, the database state data may include an indication of an amount of data currently used by each of the one or more databases. Further, an average storage usage threshold for each of the one or more databases may be retrieved. The average storage usage threshold for each of the one or more databases may indicate an average amount of storage used by each of the one or more databases. A peak storage usage threshold for each of the one or more databases may be retrieved. The peak storage usage threshold for each of the one or more databases may indicate an amount of storage that may be allocated without causing an abnormal termination of the one or more databases. Based on inputting the database state data, the average storage usage threshold, and the peak storage usage threshold, into one or more machine learning models, an amount of overallocated storage for each of the one or more databases. The overallocated amount of storage may be deallocated in order to free up storage for use by other databases and/or applications. Optionally, based on inputting the amount of overallocated data into the one or more machine learning models, an amount of the overallocated storage to deallocate from each of the one or more databases. The amount of the overallocated storage to deallocate may be an amount that is less than the overallocated amount of storage and may allow for a buffer of additional storage in addition to the amount determined by the one or more machine models. The overallocated storage may then be deallocated from each of the one or more databases.

FIG. 1 depicts an illustrative computing environment for automated storage forecasting, allocation, and/or deallocation in accordance with one or more aspects of the disclosure. Referring to FIG. 1, computing environment 100 may include one or more computing systems. For example, computing environment 100 may include storage allocation platform 102, database system 104, reserve storage device 106, and machine learning model training system 108.

As described further below, storage allocation platform 102 may comprise a computing system that includes one or more computing devices (e.g., computing devices comprising one or more processors, one or more memory devices, one or more storage devices, and/or communication interfaces) that may be used to allocate and/or deallocate storage of a storage device or storage system (e.g., a storage system that is used to store one or more databases). For example, the storage allocation platform 102 may be configured to implement one or more machine learning models that may be configured and/or trained to receive database state data from a database, determine average storage usage thresholds (e.g., an average amount of storage used or predicted to be used by a database), determine peak storage usage thresholds (e.g., a maximum amount of storage that may be allocated for use by a database), determine an amount of storage to allocate to a database, determine an amount of storage to deallocate from a database, allocate storage to a database, or deallocate storage from a database.

In some implementations, the storage allocation platform 102 may transmit data (e.g., a request to access a database) that may be used to access information (e.g., database state data) associated with the database system 104 which may comprise one or more databases. The data transmitted by the storage allocation platform 102 may be transmitted to database system 104 and/or reserve storage device 106 which may be configured to grant access to the database system 104. For example, authorization to allocate and/or deallocate storage of the database system 104 and/or reserve storage device 106 may be restricted to an authorized user of the database system 104 (e.g., a database administrator with permission to access and/or modify the database system 104). Communication between the storage allocation platform 102, database system 104, reserve storage device 106, and/or the machine learning model training system 108 may be encrypted. In some embodiments, the storage allocation platform 102 may access one or more computing devices and/or computing systems remotely. For example, the storage allocation platform 102 may remotely access the database system 104 and/or the reserve storage device 106.

Database system 104 may comprise a computing device or computing system that is configured to operate one or more databases, store one or more databases, modify one or more databases, generate one or more databases, and/or delete one or more databases. The database system 104 may be located at a different physical location than the storage allocation platform 102 and/or the reserve storage device 106. Although a single instance of the database system 104 is shown, this is for illustrative purposes only, and any number of database systems may be included in the computing environment 100 without departing from the scope of the disclosure. Each of the one or more computing devices and/or one or more computing systems described herein may comprise one or more processors, one or more memory devices, one or more storage devices (e.g., one or more solid state drives (SSDs), one or more hard disk drives (HDDs), and/or one or more hybrid drives that incorporate SSDs, HDDS, and/or RAM), and/or a communication interface that may be used to send and/or receive data and/or perform operations including determining whether to grant access to a database (e.g., database system 104), allocating storage to a database, and/or deallocating storage from a database. For example, the reserve storage device 106 may receive, from the storage allocation platform 102, a request for information regarding the amount of storage the reserve storage device 106 has available to allocated to the database system 104.

In some implementations, reserve storage device 106 may include storage that may be allocated to database system 104. In particular, reserve storage device 106 may comprise one or more storage devices as described herein. Further, reserve storage device 106 may include storage that may be allocated for use by databases that are implemented on database system 104. Additionally, when storage that was allocated from reserve storage device 106 to database system 104 is deallocated, the storage may be made available for allocation to another database.

Machine learning model training system 108 may comprise a computing system that includes one or more computing devices (e.g., servers, server blades, and/or the like) and/or other computer components (e.g., one or more processors, one or more memory devices, and/or one or more communication interfaces) that may be used to store training data that may be used to train one or more machine learning models. For example, the machine learning model training system 108 may store training data comprising one or more training instructions for a database, training processes for a database, and/or training threads executed by a database. One or more machine learning models stored and/or trained on the machine learning model training system 108 may include the one or more machine learning models on the storage allocation platform 102. Further, the one or more machine learning models of the storage allocation platform 102 may be trained and/or updated by the machine learning model training system 108.

Computing environment 100 may include one or more networks, which may interconnect the storage allocation platform 102, database system 104, reserve storage device 106, and/or machine learning model training system 108. For example, computing environment 100 may include a network 101 which may interconnect, e.g., storage allocation platform 102, database system 104, reserve storage device 106, and/or machine learning model training system 108. In some instances, the network 101 may be a 5G data network, and/or other data network.

In one or more arrangements, storage allocation platform 102, database system 104, reserve storage device 106, and/or machine learning model training system 108 may comprise one or more computing devices capable of sending and/or receiving data and processing the data accordingly. For example, storage allocation platform 102, database system 104, reserve storage device 106, machine learning model training system 108 and/or the other systems included in computing environment 100 may, in some instances, include server computers, desktop computers, laptop computers, tablet computers, smart phones, or the like that may include one or more processors, one or more memory devices, communication interfaces, one or more storage devices, and/or other components. Further, any combination of storage allocation platform 102, reserve storage device 106, and/or machine learning model training system 108 may, in some instances, be special-purpose computing devices configured to perform specific functions. For example, storage allocation platform 102 may comprise one or more application specific integrated circuits (ASICs) that are configured to process database state data, implement one or more machine learning models, allocate storage to a database, and/or deallocate storage from a database.

Figure 2:
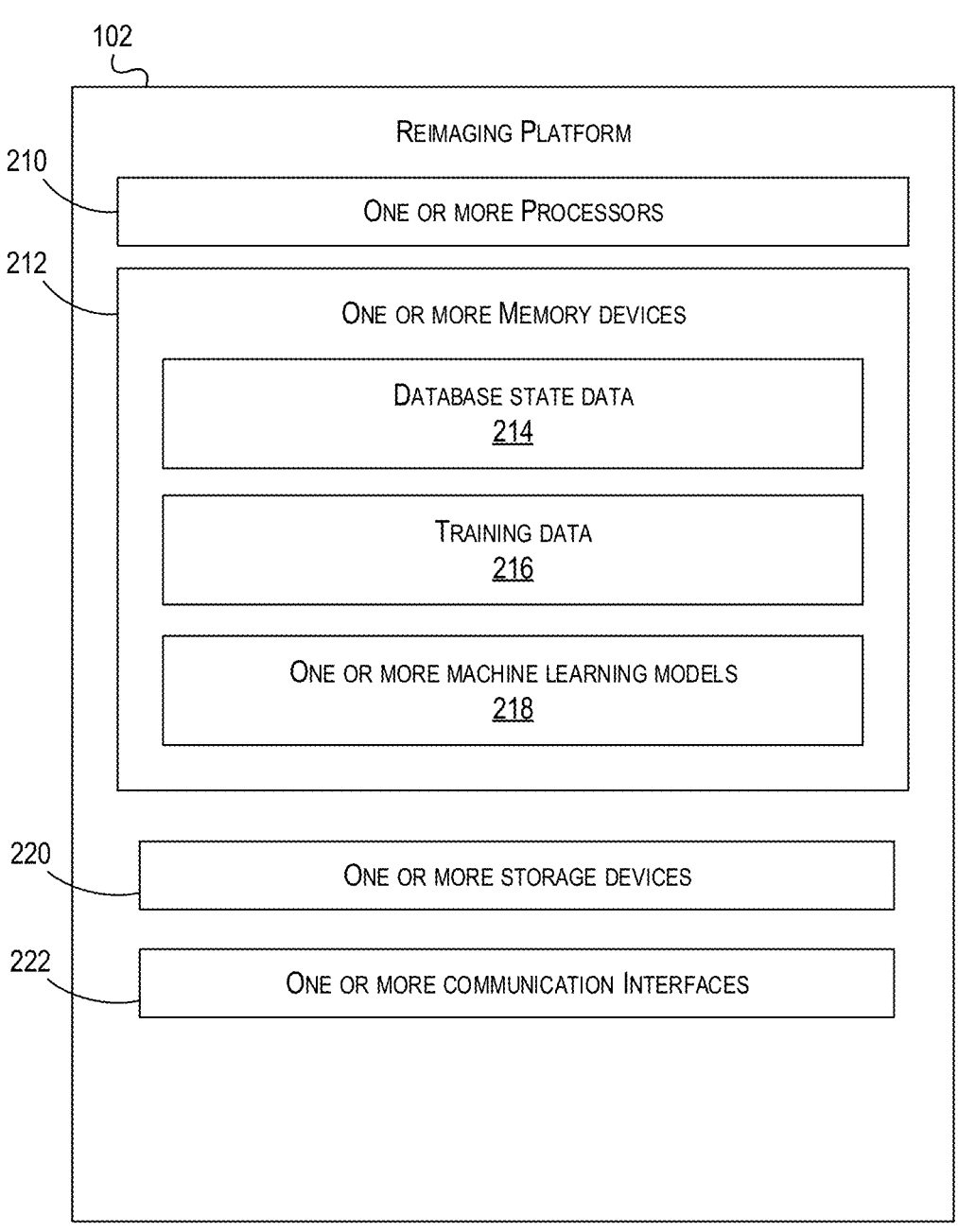
FIG. 2 depicts an illustrative computing platform for automated storage forecasting, allocation, and/or deallocation in accordance with one or more aspects of the disclosure.

FIG. 2 depicts an illustrative computing platform for automated storage forecasting, allocation, and/or deallocation in accordance with one or more aspects of the disclosure. Storage allocation platform 102 may include one or more processors (e.g., processor 210), one or more memory devices 212, and a communication interface (e.g., one or more communication interfaces 222). A data bus may interconnect the processor 210, one or more memory devices 212, one or more storage devices 220, and/or one or more communication interfaces 222. One or more communication interfaces 222 may be configured to support communication between storage allocation platform 102 and one or more networks (e.g., network 101, or the like). One or more communication interfaces 222 may be communicatively coupled to the one or more processor 210. The memory may include one or more program modules having instructions that when executed by one or more processor 210 cause the storage allocation platform 102 to perform one or more functions described herein and/or access data that may store and/or otherwise maintain information which may be used by such program modules and/or one or more processors 210. The one or more memory devices 212 may comprise RAM. In some instances, the one or more program modules and/or databases may be stored by and/or maintained in different memory units of storage allocation platform 102 and/or by different computing devices that may form and/or otherwise make up storage allocation platform 102. For example, the memory may have, host, store, and/or include database state data 214, training data 216, and/or one or more machine learning models 218. One or more storage devices 220 (e.g., solid state drives and/or hard disk drives) may also be used to store data including the database state data. The one or more storage devices 220 may comprise non-transitory computer readable media that may store data when the one or more storage devices 220 are in an active state (e.g., powered on) or an inactive state (e.g., sleeping or powered off).

Database state data 214 may comprise database state data indicating the state of one or more databases (e.g., database system 104). For example, the database state data 214 may comprise a hardware identifier of a computing device that is authorized to access, allocate, and/or deallocate storage of a database (e.g., a RDBMS) and/or software information indicating a type of database software used by a database system. Training data 216 may comprise one or more historical states of one or more historical databases and may be used to train one or more machine learning models (e.g., machine learning models 218).

One or more machine learning models 218 may implement, refine, train, maintain, and/or otherwise host an artificial intelligence model that may be used to process, analyze, evaluate, and/or generate data. For example, the one or more machine learning models 218 may process, analyze, and/or evaluate database state data 214. Further, the one or more machine learning models 218 may generate output including one or more average storage usage thresholds, peak storage usage thresholds, additional storage to allocate, and/or excess storage to deallocate as described herein. Further, one or more machine learning models 218 may comprise one or more instructions that direct and/or cause the storage allocation platform 102 to access the database state data 214 and/or perform other functions. Further, one or more machine learning models 218 may comprise a machine learning model that comprises one or more instructions to allocate and/or deallocate storage of a database as described herein.

Figure 3:
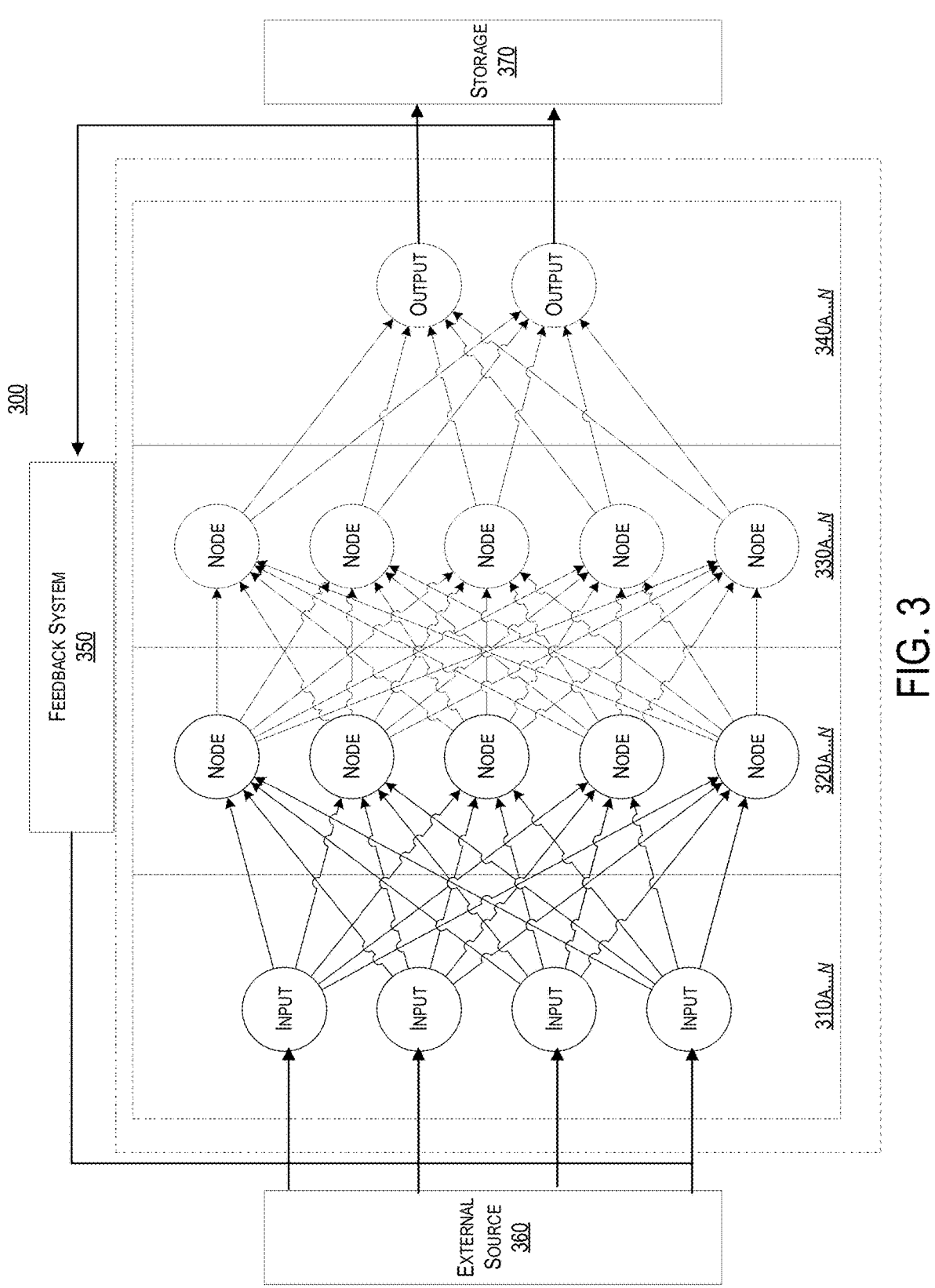
FIG. 3 depicts nodes of an illustrative artificial neural network on which a machine learning algorithm may be implemented in accordance with one or more aspects of the disclosure.

FIG. 3 depicts nodes of an illustrative artificial neural network on which a machine learning algorithm may be implemented in accordance with one or more aspects of the disclosure. In FIG. 3, each of input nodes 310*a-n* may be connected to a first set of processing nodes 320*a-n*. Each of the first set of processing nodes 320*a-n* may be connected to each of a second set of processing nodes 330*a-n*. Each of the second set of processing nodes 330*a-n* may be connected to each of output nodes 340*a-n*. Though only two sets of processing nodes are shown, any number of processing nodes may be implemented. Similarly, though only four input nodes, five processing nodes, and two output nodes per set are shown in FIG. 3, any number of nodes may be implemented per set. Data flows in FIG. 3 are depicted from left to right: data may be input into an input node, may flow through one or more processing nodes, and may be output by an output node. Input into the input nodes 310*a-n* may originate from an external source 360. Output may be sent to a feedback system 350 and/or to storage 370. The feedback system 350 may send output to the input nodes 310*a-n* for successive processing iterations with the same or different input data.

In one illustrative method using feedback system 350, the system may use machine learning to determine an output. The output may include storage usage thresholds (e.g., average storage usage thresholds and/or peak storage usage thresholds) to allocate and/or deallocate storage to databases and/or reserve storage devices, an amount of additional storage (e.g., a forecasted amount of additional storage) to allocate to a database and/or reserve storage device, and/or an amount of excess storage to deallocate from a database and/or reserve storage device, regression output, confidence values, and/or classification output. The system may use any machine learning model including one or more generative adversarial networks (GANs), XGBoosted decision trees, auto-encoders, perceptron, decision trees, support vector machines, regression, and/or a neural network. The neural network may be any type of neural network including a feed forward network, radial basis network, recurrent neural network, long/short term memory, gated recurrent unit, auto encoder, variational autoencoder, convolutional network, residual network, Kohonen network, and/or other type. In one example, the output data in the machine learning system may be represented as multi-dimensional arrays, an extension of two-dimensional tables (such as matrices) to data with higher dimensionality.

The neural network may include an input layer, a number of intermediate layers, and an output layer. Each layer may have its own weights. The input layer may be configured to receive as input one or more feature vectors described herein. The intermediate layers may be convolutional layers, pooling layers, dense (fully connected) layers, and/or other types. The input layer may pass inputs to the intermediate layers. In one example, each intermediate layer may process the output from the previous layer and then pass output to the next intermediate layer. The output layer may be configured to output a classification or a real value. In one example, the layers in the neural network may use an activation function such as a sigmoid function, a Tanh function, a ReLu function, and/or other functions. Moreover, the neural network may include a loss function. A loss function may, in some examples, measure a number of missed positives; alternatively, it may also measure a number of false positives. The loss function may be used to determine error when comparing an output value and a target value. For example, when training the neural network the output of the output layer may be used as a prediction and may be compared with a target value of a training instance to determine an error. The error may be used to update weights in each layer of the neural network.

In one example, the neural network may include a technique for updating the weights in one or more of the layers based on the error. The neural network may use gradient descent to update weights. Alternatively, the neural network may use an optimizer to update weights in each layer. For example, the optimizer may use various techniques, or combination of techniques, to update weights in each layer. When appropriate, the neural network may include a mechanism to prevent overfitting—regularization (such as L1 or L2), dropout, and/or other techniques. The neural network may also increase the amount of training data used to prevent overfitting.

Once data for machine learning has been created, an optimization process may be used to transform the machine learning model. The optimization process may include (1) training the data to predict an outcome, (2) defining a loss function that serves as an accurate measure to evaluate the machine learning model's performance, (3) minimizing the loss function, such as through a gradient descent algorithm or other algorithms, and/or (4) optimizing a sampling method, such as using a stochastic gradient descent (SGD) method where instead of feeding an entire dataset to the machine learning algorithm for the computation of each step, a subset of data is sampled sequentially. In one example, optimization comprises minimizing the number of false positives to maximize a user's experience. Alternatively, an optimization function may minimize the number of missed positives to optimize minimization of losses.

In one example, FIG. 3 depicts nodes that may perform various types of processing, such as discrete computations, computer programs, and/or mathematical functions implemented by a computing device. For example, the input nodes 310*a-n* may comprise logical inputs of different data sources, such as one or more data servers. The processing nodes 320*a-n* may comprise parallel processes executing on multiple servers in a data center. And, the output nodes 340*a-n* may be the logical outputs that ultimately are stored in results data stores, such as the same or different data servers as for the input nodes 310*a-n*. Notably, the nodes need not be distinct. For example, two nodes in any two sets may perform the exact same processing. The same node may be repeated for the same or different sets.

Each of the nodes may be connected to one or more other nodes. The connections may connect the output of a node to the input of another node. A connection may be correlated with a weighting value. For example, one connection may be weighted as more important or significant than another, thereby influencing the degree of further processing as input traverses across the artificial neural network. Such connections may be modified such that the artificial neural network 300 may learn and/or be dynamically reconfigured. Though nodes are depicted as having connections only to successive nodes in FIG. 3, connections may be formed between any nodes. For example, one processing node may be configured to send output to a previous processing node.

Input received in the input nodes 310a-n may be processed through processing nodes, such as the first set of processing nodes 320a-n and the second set of processing nodes 330a-n. The processing may result in output in output nodes 340a-n. As depicted by the connections from the first set of processing nodes 320a-n and the second set of processing nodes 330a-n, processing may comprise multiple steps or sequences. For example, the first set of processing nodes 320a-n may be a rough data filter, whereas the second set of processing nodes 330a-n may be a more detailed data filter.

The artificial neural network 300 may be configured to effectuate decision-making. As a simplified example for the purposes of explanation, the artificial neural network 300 may be configured to generate instructions (e.g., instructions to allocate storage to a database and/or deallocate storage from a database), threshold output (e.g., indications of average storage usage thresholds or peak storage usage thresholds indicating amounts of storage that may be allocated to a database or reserve storage device), additional storage allocation output (e.g., indications of a forecasted amount of additional storage to allocate to a database), and/or excess storage deallocation (e.g., indications of excess amounts of storage to deallocate from a database). The input nodes 310a-n may be provided with database state data that is based on one or more states of a database. The first set of processing nodes 320a-n may be each configured to perform specific steps to analyze the database state data, such as determining an amount of storage to allocate and/or deallocate to a database. The second set of processing nodes 330a-n may be each configured to allocate and/or deallocate storage to a database in order to assign an appropriate amount of storage to the database. Multiple subsequent sets may further refine this processing, each looking for further more specific tasks, with each node performing some form of processing which need not necessarily operate in the furtherance of that task. The artificial neural network 300 may then execute or cause to be executed operations that allocate and/or deallocate storage to a database.

The feedback system 350 may be configured to determine the accuracy of the artificial neural network 300. Feedback may comprise an indication of similarity between the value of an output generated by the artificial neural network 300 and a ground-truth value. For example, in the database state data analysis example provided above, the feedback system 350 may be configured to determine an average storage allocation prediction accuracy values that are generated for multiple portions of database state data. The feedback system 350 may already have access to the ground-truth data (e.g., optimized storage allocation prediction values using known processes), such that the feedback system may train the artificial neural network 300 by indicating the accuracy of the output generated by the artificial neural network 300. The feedback system 350 may comprise human input, such as an administrator telling the artificial neural network 300 whether it made a correct decision. The feedback system may provide feedback (e.g., an indication of whether the previous output was correct or incorrect and/or an extent to which the amount of storage indicated in the storage allocation prediction values was similar to the ground-truth allocation prediction values) to the artificial neural network 300 via input nodes 310a-n or may transmit such information to one or more nodes. The feedback system 350 may additionally or alternatively be coupled to the storage 370 such that output is stored. The feedback system may not have correct answers at all, but instead base feedback on further processing: for example, the feedback system may comprise a system programmed to analyze and validate database state data, such that the feedback allows the artificial neural network 300 to compare its results to that of a manually programmed system.

The artificial neural network 300 may be dynamically modified to learn and provide better input. Based on, for example, previous input and output and feedback from the feedback system 350, the artificial neural network 300 may modify itself. For example, processing in nodes may change and/or connections may be weighted differently. Additionally or alternatively, the node may be reconfigured to process database state data differently. The modifications may be predictions and/or guesses by the artificial neural network 300, such that the artificial neural network 300 may vary its nodes and connections to test hypotheses.

The artificial neural network 300 need not have a set number of processing nodes or number of sets of processing nodes, but may increase or decrease its complexity. For example, the artificial neural network 300 may determine that one or more processing nodes are unnecessary or should be repurposed, and either discard or reconfigure the processing nodes on that basis. As another example, the artificial neural network 300 may determine that further processing of all or part of the input is required and add additional processing nodes and/or sets of processing nodes on that basis.

The feedback provided by the feedback system 350 may be mere reinforcement (e.g., providing an indication that output is correct or incorrect, awarding the machine learning algorithm a number of points, or the like) or may be specific (e.g., providing the correct output). The artificial neural network 300 may be supported or replaced by other forms of machine learning. For example, one or more of the nodes of artificial neural network 300 may implement a decision tree, associational rule set, logic programming, regression model, cluster analysis mechanisms, Bayesian network, propositional formulae, generative models, and/or other algorithms or forms of decision-making. The artificial neural network 300 may effectuate deep learning.

In some implementations, the artificial neural network 300 may receive input including one or more input features. The one or more input features may comprise information associated with a number of one or more databases, an amount of storage allocated to one or more databases, user information associated with the one or more databases (e.g., user data encrypted to maintain privacy), metadata describing data and the relationship between tables of one or more databases, read and write privileges of one or more databases, data types of one or more databases (e.g., integer values, Boolean values, floating point values, and/or character strings), and/or data constraints (e.g., a maximum value or minimum value for an amount of data to enter in a field of a database).

Figure 4:
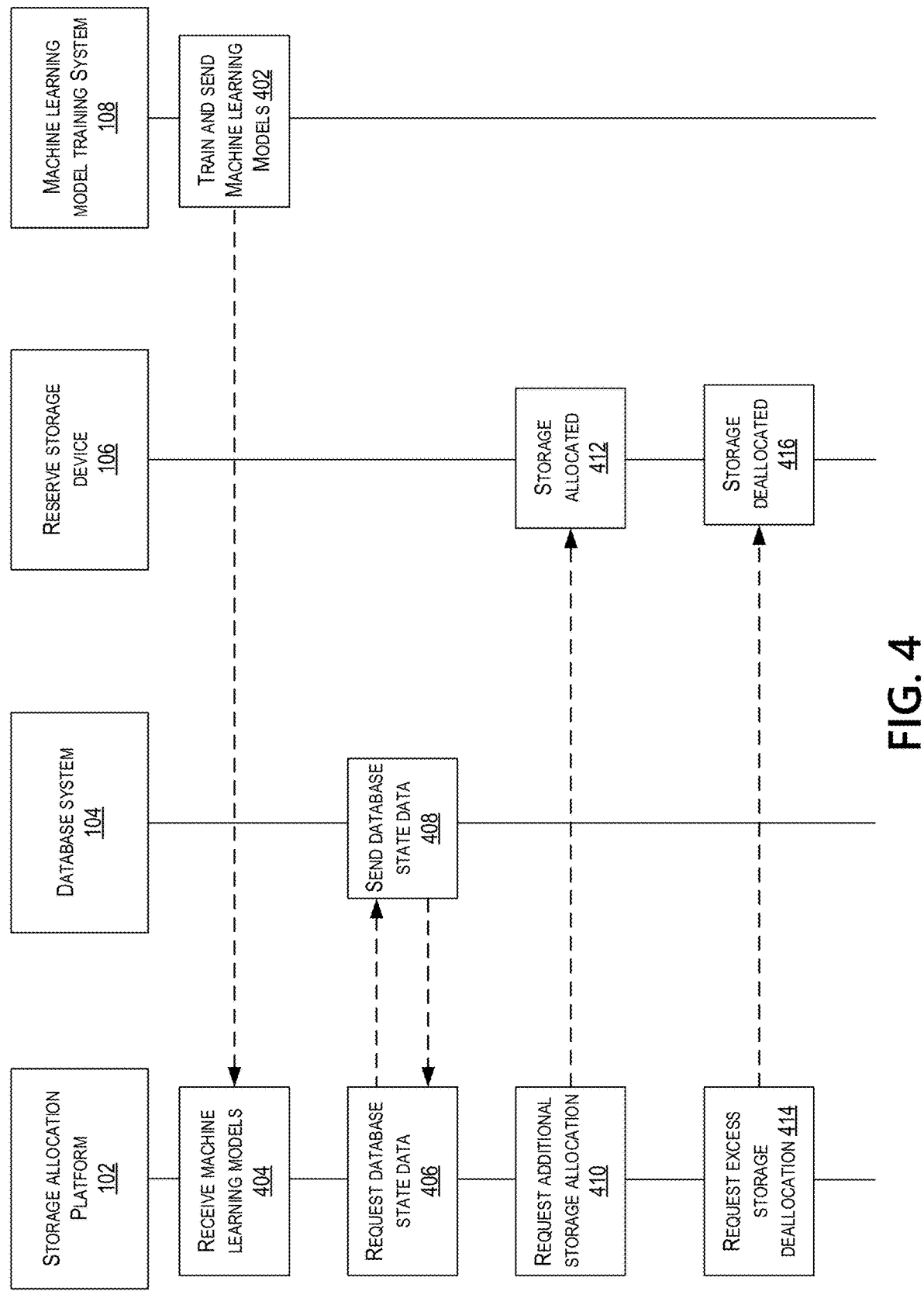
FIG. 4 depicts an illustrative event sequence for automated storage forecasting, allocation, and deallocation in accordance with one or more aspects of the disclosure.

FIG. 4 depicts an illustrative event sequence for automated storage forecasting, allocation, and/or deallocation in accordance with one or more example embodiments. Referring to FIG. 4, at step 402, a machine learning model training system 108 may train one or more machine learning models to allocate and/or deallocate storage of one or more databases. The machine learning model training system may then send the trained machine learning models to storage allocation platform 102. In some embodiments, storage allocation platform 102 may periodically establish a data connection with the machine learning model training system 108 in order to receive up to date copies of one or more machine learning models (e.g., the one or more machine learning models 218 described with respect to FIG. 2 and/or the artificial neural network 300 that is described with respect to FIG. 3) that may be used to allocate and/or deallocate storage of the database system 104. In some instances, the machine learning model training system 108 may determine whether the storage allocation platform 102 has an updated copy of the one or more machine learning models and may send an indication to the storage allocation platform 102 if an update is not warranted at that time. At step 404, the storage allocation platform 102 may receive the one or more machine learning models and if necessary perform an update of the one or more machine learning models stored on the storage allocation platform 102.

At step 406, the storage allocation platform 102 may request access to database system 104 in order to retrieve database state data from database system 104. As described herein, the database state data may indicate one or more current and/or past states of the database system 104 and/or reserve storage device 106. At step 408, database system 104 may send the database state data which may be stored on database system 104. In some embodiments, retrieval of database state data may be based on a request to allocate and/or deallocate storage of the database system 104 that sent from the storage allocation platform 102 to the database system 104 and/or another computing system that is authorized to grant access to the database system 104 and/or reserve storage device 106.

At step 410, the storage allocation platform 102 may use the one or more machine learning models to perform operations on the database state data retrieved from database system 104. Based on the operations performed by storage allocation platform 102, a forecasted of additional storage to allocate to the database system 104 may be determined. Storage allocation platform 102 may then request that the additional amount of storage be allocated to reserve storage device 106. At step 412, based on the forecasted amount of additional storage to allocate that was determined in step 410, the additional storage may be allocated to database system 104 from reserve storage device 106.

At step 414, the storage allocation platform 102 may use the one or more machine learning models to perform operations on the database state data retrieved from database system 104. Based on the operations performed by storage allocation platform 102, an amount of excess storage to deallocate from the database system 104 may be determined. Storage allocation platform 102 may then request that the excess amount of storage be deallocated from database system 104. At step 416, based on the amount of excess storage to allocate that was determined in step 414, the excess storage may be deallocated from database system 104.

Figure 5:
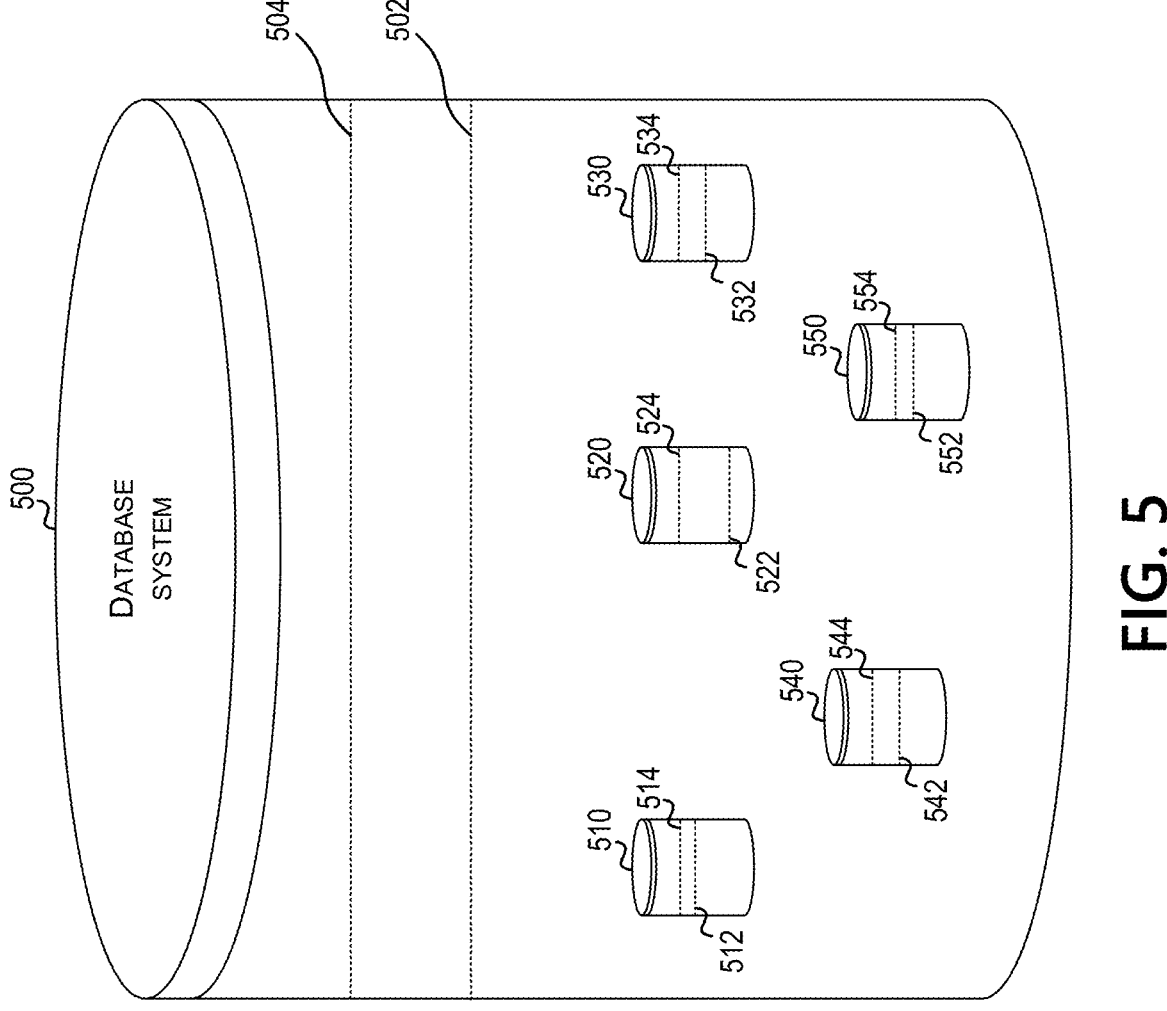
FIG. 5 depicts an illustrative database system in accordance with one or more aspects of the disclosure.

FIG. 5 depicts an illustrative database system 500 in accordance with one or more aspects of the disclosure. The database system 500 may comprise the features and/or capabilities of databases and/or database systems described herein including the database system 104 described with respect to FIG. 1. Referring to FIG. 5, database system 500 may include one or more storage devices which may store one or more databases. For example, the one or more databases may include one or more databases that are accessed via a relational database management system. In this example, the database system 500 comprises database 510, database 520, database 530, database 540, and database 550. Each of the databases 510-550 may comprise a respective average storage usage threshold and/or peak storage usage threshold. For example, databases 510/520/530/540/550 respectively comprise average storage usage thresholds 512/522/532/542/552 and peak storage usage thresholds 512/522/532/542/552.

As shown in FIG. 5, the average storage usage thresholds and peak storage usage thresholds may be different in different databases. For example, database 510 has a different average storage usage threshold from database 530. Further, database system 500 comprises an average storage usage threshold 502 and a peak storage usage threshold 504. The average storage usage threshold 502 may change over time based on the amount of storage used by the databases 510-550. For example, if the average storage usage of databases 510-550 decreases over time, the average storage usage threshold 502 for database system 500 may also decrease. Further, the peak storage usage threshold 504 may be constrained by the amount of storage (e.g., physical amount of storage) that is available to database system 500 such that the peak storage usage threshold 504 may not exceed the amount of storage available to database system 500. Additionally, the peak storage usage threshold of databases 510 may be constrained by the amount of storage available to the database system 500 such that the peak storage usage thresholds for databases 510-550 may not exceed the amount of storage available to the database system 500.

In some embodiments, the database system 500 may comprise and/or be associated with a computing device or computing system that is configured to access data comprising banking information or financial information. For example, the data may comprise transaction information, customer account information, and/or account information any of which may be encrypted to preserve security and/or confidentiality. Although a single instance of the database system 500 and five databases 510-550 are shown, this is for illustrative purposes only, and any number of database systems and/or databases may be implemented without departing from the scope of the disclosure.

Figure 6:
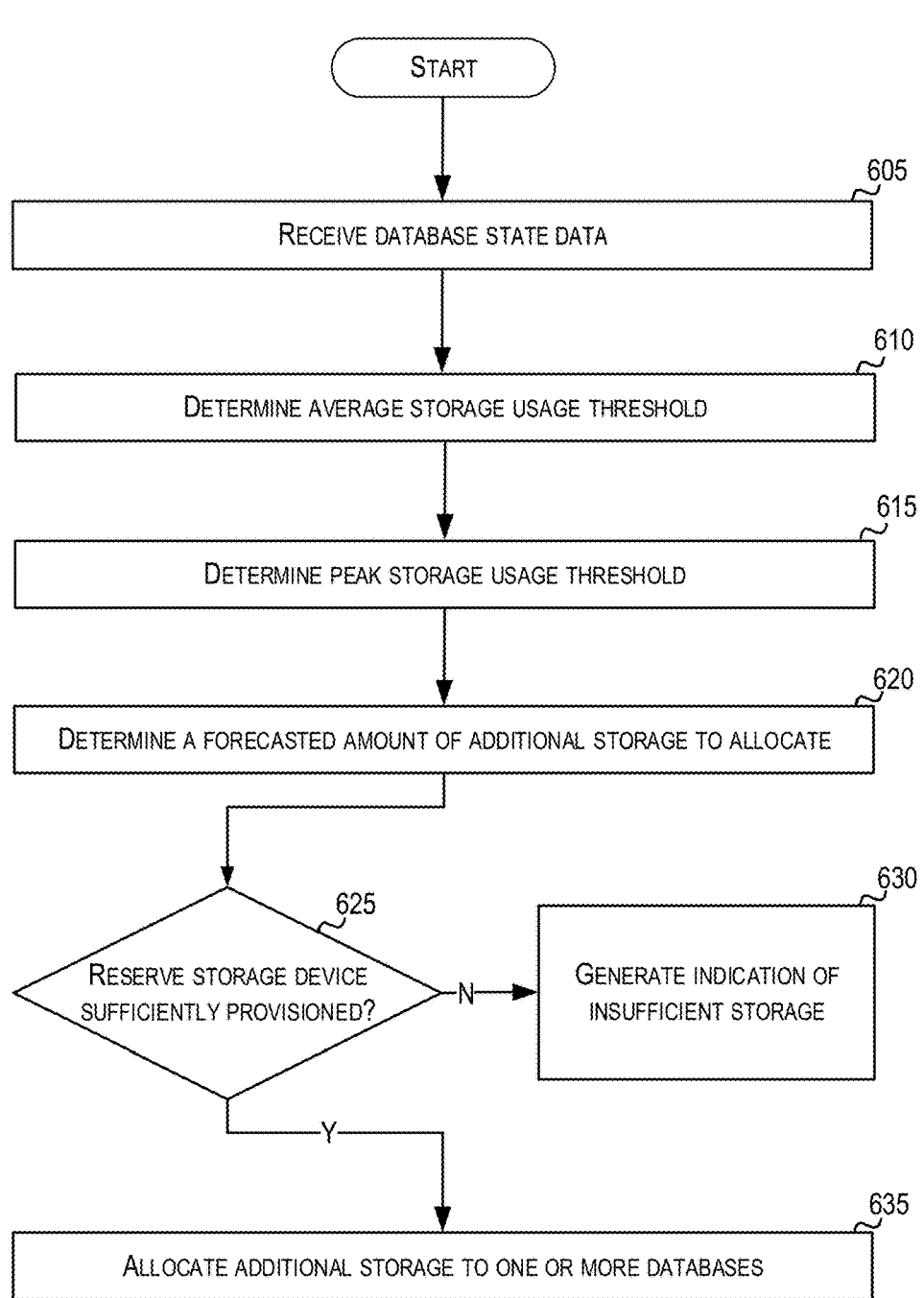
FIG. 6 depicts an illustrative method for automatically forecasting and allocating storage for use by databases in accordance with one or more aspects of the disclosure.

FIG. 6 depicts an illustrative method for automatically forecasting and allocating storage for use by databases in accordance with one or more example embodiments. The steps of a method 600 for automatically forecasting and allocating storage for use by databases may be implemented by a computing device or computing system (e.g., the storage allocation platform 102) in accordance with the computing devices and/or computing systems described herein. One or more of the steps described with respect to FIG. 6 may be omitted, performed in a different order, and/or modified. Further, one or more other steps (e.g., the steps described with respect to FIGS. 7-11) may be added to the steps described with respect to FIG. 6.

At step 605, a computing system may retrieve database state data comprising an indication of one or more states (e.g., one or more current states) of one or more databases (e.g., RDBMSs). For example, a computing system (e.g., the storage allocation platform 102) may retrieve database state data comprising an indication of an amount of storage (e.g., data stored on an SSD) that is allocated to each of the one or more databases.

At step 610, a computing system may determine, based on inputting the database state data into one or more machine learning models, an average storage usage threshold for the one or more databases (e.g., a separate average storage usage threshold for each of the one or more databases). The average storage threshold for each of the one or more databases may indicate an average amount of storage used by each of the one or more databases. For example, the storage allocation platform 102 may input the database state data into one or more machine learning models 218, which may be configured and/or trained to generate and/or determine the average storage usage threshold for each of the one or more databases.

At step 615, a computing system may determine, based on inputting the database state data into the one or more machine learning models, a peak storage usage threshold for the one or more databases (e.g., a separate peak storage usage threshold for each of the one or more databases). The peak storage usage threshold for each of the one or more databases may indicate an amount of storage that is allocatable without causing an abnormal termination. For example, the storage allocation platform 102 may input the database state data into one or more machine learning models 218, which may be configured and/or trained to generate and/or determine the peak storage usage threshold for each of the one or more databases.

At step 620, a computing system may determine, based on inputting the database state data, the one or more average storage usage thresholds, and/or the one or more peak storage usage thresholds into the one or more machine learning models, a forecasted amount of additional storage to allocate to each of the one or more databases in order to prevent the abnormal termination of the one or more databases. For example, the storage allocation platform 102 may input the database state data into one or more machine learning models 218, which may be configured and/or trained to generate and/or determine the forecasted amount of additional storage to allocate to each of the one or more database. In some embodiments, the database state data may comprise the average storage usage thresholds and/or peak storage usage thresholds for the one or more databases).

At step 625, the computing system may, based on the reserve storage device being sufficiently provisioned with the additional amount of storage, step 630 may be performed. For example, a computing system (e.g., the storage allocation platform 102) may determine whether a storage device (e.g., reserve storage device 106) is sufficiently provisioned to allocate the additional storage to database system 104. Determining whether the reserve storage device 106 is sufficiently provisioned may comprise determining an amount of storage that is available to be allocated from the reserve storage device 106. If the amount of storage that is available to be allocated from the reserve storage device 106 is equal to or greater than the additional amount of storage, then the additional storage may be allocated to one or more databases of the database system 104. For example, if the additional amount of storage is equal to one hundred gigabytes of storage and the reserve storage device has two hundred gigabytes of storage available then the additional amount of storage may be provisioned to the one or more databases.

Based on the reserve storage device not being sufficiently provisioned, step 630 may be performed. For example, a computing system (e.g., the storage allocation platform 102) may analyze the reserve storage device 106 and determine that the reserve storage device 106 has an available amount of storage that is less than the additional amount of storage to be allocated.

At step 630, a computing system may generate an indication that the reserve storage device is not sufficiently provisioned to allocate the additional storage. For example, if the additional amount of storage is one hundred gigabytes of storage and a reserve storage device 106 has fifty gigabytes of available storage, the storage allocation platform 102 may generate a message indicating "INSUFFICIENT STORAGE AVAILABLE, UNABLE TO ALLOCATE ADDITIONAL DATA" that may be displayed on a display device of the storage allocation platform 102.

At step 635, a computing system may allocate, from a reserve storage device, the additional storage to the one or more databases. For example, if the additional amount of storage to be allocated is one hundred gigabytes of storage and a reserve storage device 106 has eight terabytes of available storage, the storage allocation platform 102 may allocate one hundred gigabytes of storage from the reserve storage device 106 to one or more databases of database system 104. In some embodiments, the actual amount of additional storage that is allocated to the one or more databases may be greater than the amount of storage that would sufficiently provision the one or more databases with storage. For example, the storage allocation platform 102 may allocate an additional buffer amount of storage equal to ten percent of the amount of storage that would sufficiently provision the one or more databases. In this way a buffer of additional storage may be maintained in order to accommodate unexpected increases in storage usage. Further, the computing system may increase the additional amount of storage to allocate to each of the one or more databases by a predetermined additional buffer amount. The predetermined additional buffer amount may comprise a fixed amount of storage or be a proportion of the amount of additional storage to allocate. For example, the storage allocation platform 102 may allocate one-hundred and two percent of the amount of additional storage to each of the databases in order to maintain a buffer of additional storage to accommodate unexpectedly high storage use. By way of further example, the storage allocation platform 102 may increase an amount of additional storage to allocate to each of the databases by a fixed amount of five gigabytes of storage in order to maintain at least a five gigabyte buffer of additional storage to accommodate unexpectedly high storage use.

In some embodiments, an amount of the additional storage to allocate to each of the one or more databases may be based on a configuration of the one or more databases. For example, the storage allocation platform 102 may analyze the one or more databases and determine a configuration of each of the one or more databases. For example, as part of determining the configuration of the one or more databases the storage allocation platform 102 may determine the types of applications that access the one or more databases and/or the types of data (e.g., text data, audio data, and/or video data) associated with the one or more databases. Based on the types of applications and/or types of data associated with the one or more databases, the storage allocation platform 102 may allocate different amounts of additional storage to each of the one or more databases. For example, a database that is associated with frequently updated transaction data for a banking application may be accessed and modified more frequently and may be allocated a greater amount of additional storage than another database that is less frequently accessed and/or modified.

FIG. 7 depicts an illustrative method for automatically training a machine learning model to generate an average threshold prediction accuracy in accordance with one or more example embodiments. The steps of a method 700 for automatically training a machine learning model to generate an average threshold prediction accuracy may be implemented by a computing device or computing system (e.g., the storage allocation platform 102) in accordance with the computing devices and/or computing systems described herein. One or more of the steps described with respect to FIG. 7 may be omitted, performed in a different order, and/or modified. Further, one or more other steps (e.g., the steps described with respect to FIGS. 6 and/or 8-11) may be added to the steps described with respect to FIG. 7.

At step 705, a computing system may access training data. The training data may comprise a plurality of historical states of a plurality of historical databases. Further, the training data may comprise a plurality of historical average storage usage thresholds based on historical storage usage of the plurality of historical databases. For example, the training data may be stored in a storage device of the machine learning model training system 108 or a remote storage system and may be accessed by the machine learning model training system 108 in order to train and/or retrain a machine learning model.

At step 710, a computing system may generate a plurality of average storage usage training thresholds. Generating the plurality of average storage usage training thresholds may be based on inputting the training data into the one or more machine learning models. The one or more machine learning models may comprise the features and/or capabilities of machine learning models described herein including the machine learning models described with respect to FIG. 3. For example, training data may be inputted into one or more machine learning models that are implemented on the machine learning model training system 108. The one or more machine learning models of the machine learning model training system 108 may be configured to receive the training data and perform one or more operations including analyzing the plurality of historical states of the plurality of historical databases and generating a plurality of average storage usage training thresholds. For example, the plurality of average storage usage training thresholds may be associated with an amount of storage used by the plurality of historical databases over time (e.g., over the course of a year). Based on analyzing the historical use of storage the one or more machine learning models may generate a plurality of indications of plurality of average storage usage training thresholds.

At step 715, a computing system may determine similarities between the plurality of average storage usage training thresholds and a plurality of ground-truth average storage usage thresholds. Determination of the similarities between the plurality of average storage usage training thresholds and a plurality of ground-truth average storage usage thresholds may be based on one or more comparisons of the plurality of average storage usage training thresholds to the plurality of ground-truth average storage usage thresholds. For example, the machine learning model training system may compare a plurality of average storage usage training thresholds to a plurality of ground-truth average storage usage thresholds that correctly indicate an appropriate average storage usage threshold. If the plurality of average storage usage training thresholds and a plurality of ground-truth average storage usage thresholds are similar (e.g., the same or mostly the same) then the similarity may be high, if the plurality of average storage usage training thresholds are different (e.g., not the same or having few features in common) from the plurality of ground-truth average storage usage thresholds the similarity may be low. Further, the similarity may be inversely correlated with a magnitude of the difference in the amount of storage between the plurality of average storage usage training thresholds and the plurality of ground-truth average storage usage thresholds.

At step 720, a computing system may generate, based on the similarity between the plurality of average storage usage training thresholds and the plurality of ground-truth average storage usage thresholds, an average storage usage threshold prediction accuracy of the one or more machine learning models. Generation of the average storage usage threshold prediction accuracy may be based on an extent to which indicated average storage usage training thresholds are similar to a ground-truth average storage usage training thresholds. The average storage usage training thresholds accuracy may be positively correlated with the similarity between the plurality of average storage usage training thresholds and the ground-truth average storage usage training thresholds. Further, the average storage usage threshold prediction accuracy may be based on an amount of similarities between the plurality of average storage usage training thresholds and the ground-truth storage overallocations. A greater number of similarities between the plurality of average storage usage training thresholds and the ground-truth storage overallocations may be positively correlated with a higher average storage usage threshold prediction accuracy.

At step 725, a computing system may adjust a weighting of one or more average storage usage parameters of the one or more machine learning models based on the average storage usage threshold accuracy. For example, the machine learning model training system 108 may increase the weight of the one or more average storage usage parameters that were determined to increase the average storage usage threshold accuracy and/or decrease the weight of the one or more average storage usage parameters that were determined to decrease the average storage usage threshold accuracy. Further, some of the one or more average storage usage parameters may be more heavily weighted than other average storage usage parameters. The weighting of an average storage usage parameter may be positively correlated with the extent to which the average storage usage parameter contributes to increasing the accuracy of the average storage usage prediction accuracy.

FIG. 8 depicts an illustrative method for automatically training a machine learning model to generate a peak storage usage threshold prediction accuracy in accordance with one or more example embodiments. The steps of a method 800 for automatically training a machine learning model to generate a peak storage usage threshold prediction accuracy may be implemented by a computing device or computing system (e.g., the storage allocation platform 102) in accordance with the computing devices and/or computing systems described herein. One or more of the steps described with respect to FIG. 8 may be omitted, performed in a different order, and/or modified. Further, one or more other steps (e.g., the steps described with respect to FIGS. 6, 7, and/or 9-11) may be added to the steps described with respect to FIG. 8.

At step 805, a computing system may access training data. The training data may comprise a plurality of historical states of a plurality of historical databases. The plurality of historical states of the plurality of historical databases may include a plurality of peak storage usage thresholds based on historical storage usage of the plurality of historical databases. For example, the training data may be stored in the machine learning model training system 108, which may be configured to access the training data. In some implementations, accessing the training data may be based on a request from a storage allocation platform (e.g., storage allocation platform 102) to access training data in order to train and/or retrain a machine learning model for use in allocating and/or deallocating storage for one or more databases.

At step 810, a computing system may generate a plurality of peak storage usage training thresholds. Generating the plurality of peak storage usage training thresholds may be based on inputting the training data into the one or more machine learning models. The one or more machine learning models may comprise the features and/or capabilities of machine learning models described herein including the machine learning models described with respect to FIG. 3. For example, training data may be inputted into one or more machine learning models that are implemented on the machine learning model training system 108. The one or more machine learning models of the machine learning model training system 108 may be configured to receive the training data and perform one or more operations including analyzing the plurality of historical states of the plurality of historical databases and generating a plurality of peak storage usage training thresholds. For example, the plurality of peak storage usage training thresholds may be associated with a determined peak amount of storage used by the plurality of historical databases over time (e.g., over the course of a year). Based on analyzing the historical use of storage the one or more machine learning models may generate a plurality of peak storage usage training thresholds.

At step 815, a computing system may determine similarities between the plurality of peak storage usage training thresholds and a plurality of ground-truth peak storage usage thresholds. Determination of the similarities between the plurality of peak storage usage training thresholds and a plurality of ground-truth peak storage usage training thresholds may be based on one or more comparisons of the plurality of peak storage usage training thresholds to the plurality of ground-truth peak storage usage training thresholds. For example, the machine learning model training system may compare peak storage usage training thresholds generated by the one or more machine learning models to ground-truth peak storage usage thresholds that are based on one or more states of actual databases. If the peak storage usage thresholds generated by the one or more machine learning models and ground-truth peak storage thresholds are the same then the similarity may be determined to be high, if the peak storage usage thresholds generated by the one or more machine learning models and the ground-truth peak storage usage thresholds are different, the similarity may be low.

At step 820, a computing system may generate, based on the similarity between the plurality of peak storage usage training thresholds and the plurality of ground-truth peak storage usage thresholds, a peak storage usage threshold prediction accuracy of the one or more machine learning models. Generation of the peak storage usage threshold prediction accuracy may be based on an extent to which the plurality of peak storage usage training thresholds are similar to a ground-truth peak storage usage thresholds. Accuracy of the peak storage usage training thresholds may be positively correlated with the similarity between the indications of the peak storage usage training thresholds and the ground-truth peak storage usage thresholds. Further, the peak storage usage threshold prediction accuracy may be based on an amount of similarities between the plurality of peak storage usage training thresholds and the ground-truth storage overallocations. A greater number of similarities between the plurality of peak storage usage training thresholds and the ground-truth storage overallocations may be positively correlated with a higher peak storage usage threshold prediction accuracy.

At step 825, a computing system may adjust a weighting of one or more peak storage usage parameters of the one or more machine learning models based on the peak storage usage threshold prediction accuracy. For example, the machine learning model training system 108 may increase the weight of the one or more peak storage usage parameters that were determined to increase the peak storage usage threshold prediction accuracy and/or decrease the weight of the one or more peak storage usage parameters that were determined to decrease the peak storage usage threshold prediction accuracy. Further, some of the one or more peak storage usage parameters may be more heavily weighted than other peak storage usage parameters. The weighting of a peak storage usage parameter may be positively correlated with the extent to which the peak storage usage parameter contributes to increasing the accuracy of the peak storage usage prediction accuracy.

FIG. 9 depicts an illustrative method for automatically training a machine learning model to generate a storage allocation prediction accuracy in accordance with one or more example embodiments. The steps of a method 900 for automatically training a machine learning model to generate a storage allocation prediction accuracy may be implemented by a computing device or computing system (e.g., the machine learning model training system 108 and/or the storage allocation platform 102) in accordance with the computing devices and/or computing systems described herein. One or more of the steps described with respect to FIG. 9 may be omitted, performed in a different order, and/or modified. Further, one or more other steps (e.g., the steps described with respect to FIGS. 6-8, 10, and/or 11) may be added to the steps described with respect to FIG. 9.

At step 905, a computing system may access training data. The training data may comprise a plurality of historical states of a plurality of historical databases. Further, the training data may comprise a plurality of historical storage allocations based on historical storage usage of the plurality of historical databases. For example, the training data may be stored locally or in a remote location and which the machine learning model training system 108 may be configured to access.

At step 910, a computing system may generate a plurality of storage allocation predictions. Generating the plurality of storage allocation predictions may be based on inputting the training data into the one or more machine learning models. The plurality of storage allocation predictions may comprise an amount of storage that may be allocated to a database that would result in a low likelihood of the database terminating abnormally. For example, the one or more machine learning models may generate the plurality of storage allocation predictions based on analysis of the amount of storage that was allocated to historical databases that terminated abnormally, the types of data associated with abnormal termination of a database, the times of year associated with abnormal termination of a database (e.g., times of day and/or times of year associated with greater than average database usage), and/or the frequency of abnormal termination of various databases. Generating the plurality of storage allocation predictions may be based on inputting the training data into the one or more machine learning models. The one or more machine learning models may comprise the features and/or capabilities of machine learning models described herein including the machine learning models described with respect to FIG. 3. For example, training data may be inputted into one or more machine learning models that are implemented on the machine learning model training system 108. The one or more machine learning models of the machine learning model training system 108 may be configured to receive the training data and perform one or more operations including analyzing the plurality of historical states of the plurality of historical databases and generating a plurality of storage allocation predictions. For example, the plurality of storage allocation predictions may be based on amounts of storage used by the plurality of historical databases over time (e.g., over the course of a year). Based on analyzing the historical use of storage the one or more machine learning models may generate a plurality of storage allocation predictions.

At step 915, a computing system may determine similarities between the plurality of storage allocation predictions and a plurality of ground-truth storage allocations. Determination of the similarities between the plurality of storage allocation predictions and a plurality of ground-truth storage allocations may be based on one or more comparisons of the plurality of storage allocation predictions to the plurality of ground-truth storage allocations. For example, the machine learning model training system may compare a plurality of storage allocation predictions generated by the one or more machine learning models to a plurality of ground-truth storage allocations that are based on analysis of actual databases. If the plurality of storage allocation predictions generated by the one or more machine learning models and the plurality of ground-truth storage allocations are very similar (e.g., the storage allocation generated by the one or more machine learning models is similar to ground-truth storage allocations that had a low incidence of abnormal termination) then the similarity may be determined to be high, if the plurality of storage allocation predictions generated by the one or more machine learning models and the plurality of ground-truth storage allocations are very different, then the similarity may be determined to be low.

At step 920, a computing system may generate, based on the similarity between the plurality of storage allocation predictions and the plurality of ground-truth storage allocations, a storage allocation prediction accuracy of the one or more machine learning models. The storage allocation prediction accuracy may be based on an extent to which the plurality of storage allocation predictions are similar to the plurality of ground-truth storage allocations. The storage allocation prediction accuracy may be positively correlated with the similarity between the plurality of storage allocation predictions and the plurality of ground-truth storage allocations. Further, the storage allocation prediction accuracy may be based on an amount of similarities between the storage allocation predictions and the ground-truth storage allocations. A greater number of similarities between the storage allocation predictions and the ground-truth storage allocations may be positively correlated with a higher storage allocation prediction accuracy. Further, certain types of similarities may be determined to be greater factors in determining the similarity between the plurality of storage allocation predictions and the plurality of ground-truth storage allocations. For example, the predicted storage allocation prediction for a time period in the next twelve hours may be determined to contribute more to the similarity between the plurality of storage allocation predictions and the plurality of ground-truth storage allocations than a predicted storage allocation prediction for a time period in one weeks' time.

At step 925, a computing system may adjust a weighting of one or more storage allocation parameters of the one or more machine learning models based on the storage alloca-tion prediction accuracy. For example, the machine learning model training system 108 may increase the weight of the one or more storage allocation parameters that were determined to increase the storage allocation prediction accuracy and/or decrease the weight of the one or more storage allocation parameters that were determined to decrease the storage allocation prediction accuracy. Further, some of the one or more storage allocation parameters may be more heavily weighted than other storage allocation parameters. The weighting of a storage allocation parameter may be positively correlated with the extent to which the storage allocation parameter contributes to increasing the accuracy of the storage allocation prediction accuracy.

FIG. 10 depicts an illustrative method for automatically reallocating storage used by databases in accordance with one or more example embodiments. The steps of a method 1000 for automatically reallocating storage used by databases may be implemented by a computing device or computing system (e.g., the storage allocation platform 102) in accordance with the computing devices and/or computing systems described herein. One or more of the steps described with respect to FIG. 10 may be omitted, performed in a different order, and/or modified. Further, one or more other steps (e.g., the steps described with respect to FIGS. 6-9 and/or 11) may be added to the steps described with respect to FIG. 10.

At step 1005, a computing system may retrieve database state data comprising an indication of one or more states of one or more databases. For example, a computing system (e.g., the storage allocation platform 102) may retrieve database state data comprising an indication of an amount of storage (e.g., data stored on RAM drives) that is allocated to each of the one or more databases. In some embodiments, the database state data may comprise information associated with one or more capacities of one or more databases, one or more amounts of storage currently allocated to one or more databases, one or more average storage usage thresholds for one or more databases, and/or one or more peak storage usage thresholds for one or more databases.

At step 1010, a computing system may retrieve an average storage usage threshold for each of the one or more databases. The average storage threshold for each of the one or more databases may indicate an average amount of storage used by each of the one or more databases. For example, the storage allocation platform 102 may retrieve one or more average storage usage thresholds that are stored locally in storage allocation platform 102 or retrieve one or more storage usage thresholds that are stored in one or more database systems 104. In some embodiments, one or more average storage usage thresholds may be stored in the database state data.

At step 1015, a computing system may retrieve a peak storage usage threshold for each of the one or more databases. The peak storage threshold for each of the one or more databases may indicate a peak amount of storage used by each of the one or more databases. For example, the storage allocation platform 102 may retrieve one or more peak storage usage thresholds that are stored locally in storage allocation platform 102 or retrieve one or more storage usage thresholds that are stored in one or more database systems 104. In some embodiments, one or more peak storage usage thresholds may be stored in the database state data.

At step 1020, a computing system may generate and/or determine, based on inputting the database state data, the one or more average storage usage thresholds, and/or the one or more peak storage usage thresholds into the one or more machine learning models, an amount of overallocated storage (e.g., excess storage) to deallocate from each of the one or more databases. Deallocating overallocated storage may increase the amount of storage available in the reserve storage device (e.g., storage that may be allocated to other databases) and reduce the over allocation of data to databases that have excess storage allocations. For example, the storage allocation platform 102 may input the database state data into one or more machine learning models 218, which may be configured and/or trained to generate and/or determine the amount of overallocated storage to deallocate from each of one or more databases of database system 104.

At step 1025, a computing system may determine that an amount of the overallocated storage to deallocate from each of the one or more databases will result in the amount of storage allocated to the one or more databases being greater than or equal to the average storage usage threshold. For example, a computing system (e.g., the storage allocation platform 102) may determine whether deallocating the overallocated storage will result in a database having less storage than the average storage usage threshold for that database. If deallocating the overallocated storage from a database may cause the database to have less storage than the average storage usage threshold for that database then the amount of overallocated storage for that database may be reduced until the overallocated storage amount does not cause the database to have less storage than the average storage usage threshold for that database. For example, if the overallocated storage to deallocate from a database is equal to four hundred gigabytes of storage and the reserve storage device has two hundred gigabytes of storage available then the overallocated amount of storage to deallocate may be reduced to two hundred gigabytes of storage or less.

At step 1030, a computing system may deallocate the overallocated storage from a reserve storage device (e.g., a reserve storage device from which storage was allocated for use by the one or more databases). For example, if one hundred gigabytes of storage from a reserve storage device 106 was allocated to a database implemented on database system 104, the one hundred gigabytes of storage that was allocated for use by the database will be deallocated from the reserve storage device 106. In some embodiments, the actual amount of overallocated storage that is deallocated from the one or more databases may be less than the amount of overallocated storage. Further, the computing system may reduce the amount of overallocated storage to deallocate from each of the one or more databases by a predetermined buffer amount. The predetermined buffer amount may comprise a fixed amount of storage or is a proportion of the amount of overallocated storage to deallocate. For example, the storage allocation platform 102 may deallocate ninety-five percent of the amount of overallocated storage from each of the databases in order to maintain a small buffer of storage to accommodate unexpectedly high storage use. By way of further example, the storage allocation platform 102 may reduce the amount of overallocated storage from each of the databases by twenty gigabytes of storage in order to maintain at least a twenty gigabyte buffer of storage to accommodate unexpectedly high storage use.

In some embodiments, an amount of the overallocated storage to deallocate from each of the one or more databases may be based on a configuration of the one or more databases. For example, the storage allocation platform 102 may analyze the one or more databases and determine a configuration of each of the one or more databases. For example, as part of determining the configuration of the one or more databases the storage allocation platform 102 may determine the types of applications that access the one or more databases and/or the types of data (e.g., text data, audio data, and/or video data) associated with the one or more databases. Based on the types of applications and/or types of data associated with the one or more databases, the storage allocation platform 102 may deallocate different amounts of overallocated storage from each of the one or more databases. For example, a database that is associated with infrequently updated customer data (e.g., address and/or date of birth) for a financial application may be accessed and modified less frequently and may have a greater amount deallocated than another database that is more frequently accessed and/or modified.

At step 1035, a computing system may generate an indication of the overallocated storage that is deallocated from each of the one or more databases. For example, if one hundred gigabytes of storage are deallocated from a first database identified as database one, and two hundred gigabytes of storage are deallocated from a second database identified as database two, a message indicating "ONE HUNDRED GIGABYTES OF STORAGE HAVE BEEN DEALLOCATED FROM DATABASE ONE AND TWO HUNDRED GIGABYTES OF STORAGE HAVE BEEN DEALLOCATED FROM DATABASE TWO" may be generated and displayed on a display device of the storage allocation platform 102.

At step 1040, a computing system may determine, based on inputting the database state data, the one or more average storage usage thresholds, and/or the one or more peak storage usage thresholds into the one or more machine learning models, an amount of underallocated storage to allocate to each of the one or more databases in order to prevent the abnormal termination of the one or more databases. For example, the storage allocation platform 102 may input the database state data into one or more machine learning models 218, which may be configured and/or trained to generate and/or determine the amount of underallocated storage to allocate to each of the one or more database. In some embodiments, the amount of underallocated storage may comprise an amount of data that is within a predetermined amount of the peak storage usage threshold for each of the one or more databases. For example, if a peak storage usage threshold for a database is three hundred gigabytes of storage the predetermined amount of underallocated storage may comprise an amount that is within a predetermined portion (e.g., ninety five percent) of the peak storage usage threshold (e.g., two hundred and eighty five gigabytes of storage) or an absolute amount of storage (e.g., ten gigabytes of storage) such that the predetermined amount would be two hundred and ninety gigabytes of storage.

In some embodiments, the computing system may, determine that the amount of the additional storage to allocate to each of the one or more databases is less than or equal to the peak storage usage threshold of each of the one or more databases. For example, a computing system (e.g., the storage allocation platform 102) may compare the amount of the additional storage to add to a database to the peak storage usage threshold for the database. If the computing system determines that the forecasted amount of additional storage to be allocated is less than or equal to the peak storage usage threshold for the database, then the additional storage may be allocated to the database. If the computing system determines that the forecasted amount of additional storage to be allocated greater than the peak storage usage threshold for the database, then the additional storage may be reduced to an amount less than the peak storage usage threshold before being allocated to the database.

At step 1045, a computing system may allocate, from a reserve storage device, the additional storage to the one or more databases. For example, if the additional amount of storage is one hundred gigabytes of storage and a reserve storage device 106 has eight terabytes of available storage, the storage allocation platform 102 may allocate one hundred gigabytes of storage from the reserve storage device 106 to the one or more databases.

FIG. 11 depicts an illustrative method for automatically training a machine learning model to reallocate storage in accordance with one or more example embodiments. The steps of a method 1100 for automatically training a machine learning model to reallocate storage may be implemented by a computing device or computing system (e.g., the machine learning model training system 108 and/or the storage allocation platform 102) in accordance with the computing devices and/or computing systems described herein. One or more of the steps described with respect to FIG. 11 may be omitted, performed in a different order, and/or modified. Further, one or more other steps (e.g., the steps described with respect to FIGS. 6-10) may be added to the steps described with respect to FIG. 11.

At step 1105, a computing system may access training data. The training data may comprise a plurality of historical states of a plurality of historical databases. The plurality of historical states may comprise historical average storage usage training thresholds and/or historical peak storage usage training thresholds. For example, the training data may be stored in the machine learning model training system 108, which may be configured to access the training data. In some implementations, accessing the training data may be based on a request to access training data in order to train and/or retrain a machine learning model.

At step 1110, a computing system may generate a plurality of storage overallocation predictions. Generating the plurality of storage overallocation predictions may be based on inputting the training data into the one or more machine learning models. The one or more machine learning models may comprise the features and/or capabilities of machine learning models described herein including the machine learning models described with respect to FIG. 3. For example, training data may be inputted into one or more machine learning models that are implemented on the machine learning model training system 108. The one or more machine learning models of the machine learning model training system 108 may be configured to receive the training data and perform one or more operations including analyzing the plurality of historical states of the plurality of historical databases and generating a plurality of storage overallocation predictions. For example, the plurality of storage overallocation predictions may be associated with a determined amount of storage used by the plurality of historical databases over time (e.g., over the course of a year). Based on analyzing the historical use of storage the one or more machine learning models may generate a plurality of storage overallocation predictions.

At step 1115, a computing system may determine similarities between the plurality of storage overallocation predictions and a plurality of ground-truth storage overallocations. Determination of the similarities between the plurality of storage overallocation predictions and a plurality of ground-truth storage overallocations may be based on one or more comparisons of the plurality of storage overallocation predictions to the plurality of ground-truth storage overallocations. For example, the machine learning model training system may compare storage overallocation predictions generated by the one or more machine learning models to ground-truth storage overallocations that are based on analysis of states of historical databases. If the storage overallocation predictions generated by the one or more machine learning models and the ground-truth storage overallocations have a similarity that is greater than a predetermined similarity threshold (e.g., a storage overallocation prediction that more than ninety percent similar to the ground-truth storage overallocation) then the similarity may be determined to be high, if the storage overallocation predictions generated by the one or more machine learning models and the ground-truth storage overallocations are less than the predetermined similarity threshold then the similarity may be determined to be low.

At step 1120, a computing system may determine a storage overallocation prediction accuracy of the one or more machine learning models. Determination of the storage overallocation prediction accuracy may be based on an amount and/or quality of differences (e.g., an extent to which a training instruction achieves the same result as a ground-truth training instruction) between the plurality of storage overallocation predictions and the plurality of ground-truth storage overallocations. The storage overallocation prediction accuracy may be positively correlated with the similarity between storage overallocation predictions and ground-truth storage overallocations. Further, the storage overallocation prediction accuracy may be based on an amount of similarities between the plurality of storage overallocation predictions and the ground-truth storage overallocations. A greater number of similarities between the plurality of storage overallocation predictions and the ground-truth storage overallocations may be positively correlated with a higher storage overallocation prediction accuracy. Further, certain types of similarities may be determined to be greater factors in determining the similarity between the plurality of storage overallocation predictions and the plurality of ground-truth storage overallocations. For example, the predicted storage overallocation prediction for a time period in the next twelve hours may be determined to contribute more to the similarity between the plurality of storage overallocation predictions and the plurality of ground-truth storage overallocations than a predicted storage overallocation prediction for a time period in one month's time.

At step 1125, a computing system may adjust a weighting of one or more storage overallocation parameters of the one or more machine learning models based on the storage overallocation prediction accuracy. For example, the machine learning model training system 108 may increase the weight of the one or more storage overallocation parameters that were determined to increase the storage overallocation prediction accuracy and/or decrease the weight of the one or more storage overallocation parameters that were determined to decrease the storage overallocation prediction accuracy. Further, some of the one or more storage overallocation parameters may be more heavily weighted than other storage overallocation parameters. The weighting of a storage overallocation parameter may be positively correlated with the extent to which the storage overallocation parameter contributes to increasing the accuracy of the storage overallocation prediction accuracy.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing system for deallocating overallocated storage, the computing system comprising:

one or more processors; and memory storing computer-readable instructions that, when executed by the one or more processors, cause the computing system to:

retrieve database state data comprising an indication of a state of each of one or more databases, wherein the database state data comprises an indication of an amount of data currently used by each of the one or more databases;

retrieve an average storage usage threshold for each of the one or more databases, wherein the average storage usage threshold for each of the one or more databases indicates an average amount of storage used by each of the one or more databases;

retrieve a peak storage usage threshold for each of the one or more databases, wherein the peak storage usage threshold for each of the one or more databases indicates an amount of storage that is allocatable without causing an abnormal termination;

determine, based on inputting the database state data, the average storage usage threshold, and the peak storage usage threshold, into one or more machine learning models, an amount of overallocated storage to deallocate from each of the one or more databases; and deallocate the overallocated storage from the one or more databases.

2. The computing system of claim 1, wherein the memory stores additional computer-readable instructions that, when executed by the one or more processors, further cause the computing system to:

reduce the amount of overallocated storage to deallocate from each of the one or more databases by a predetermined buffer amount.

3. The computing system of claim 2, wherein the predetermined buffer amount comprises a fixed amount of storage or is a proportion of the amount of overallocated storage to deallocate.

4. The computing system of claim 1, wherein the memory stores additional computer-readable instructions that, when executed by the one or more processors, further cause the computing system to:

determine, based on inputting the database state data, the average storage usage threshold, and the peak storage usage threshold, into one or more machine learning models, an amount of underallocated storage for each of the one or more databases, wherein the amount of underallocated storage comprises an amount of data within a predetermined amount of the peak storage usage threshold for each of the one or more databases;

determine, based on inputting the amount of underallocated data into the one or more machine learning models, an amount of additional storage to add to each of the one or more databases to prevent abnormal termination of the one or more databases; and allocate the additional storage to the one or more databases.

5. The computing system of claim 4, wherein the additional storage is allocated from a reserve storage device.

6. The computing system of claim 4, wherein the amount of the additional storage to allocate to each of the one or more databases is less than or equal to the peak storage usage threshold of each of the one or more databases.

7. The computing system of claim 1, wherein the memory stores additional computer-readable instructions that, when executed by the one or more processors, further cause the computing system to:

access training data comprising a plurality of historical states of a plurality of training databases, wherein the plurality of historical states comprise historical average storage usage training thresholds and historical peak storage usage training thresholds;

generate, based on inputting the training data into the one or more machine learning models, a plurality of storage overallocation predictions;

determine a similarity between the plurality of storage overallocation predictions and a plurality of ground-truth storage overallocations;

generate, based on the similarity between the plurality of storage overallocation predictions and the plurality of ground-truth storage overallocations, a storage overallocation prediction accuracy of the one or more machine learning models; and adjust a weighting of one or more storage overallocation parameters of the one or more machine learning models based on the storage overallocation prediction accuracy, wherein the weighting of the one or more storage overallocation parameters that increase the storage overallocation prediction accuracy is increased, and wherein the weighting of the one or more storage overallocation parameters that decrease the storage overallocation prediction accuracy is decreased.

8. The computing system of claim 1, wherein the memory stores additional computer-readable instructions that, when executed by the one or more processors, further cause the computing system to:

generate an indication of the overallocated storage that is deallocated from each of the one or more databases.

9. The computing system of claim 1, wherein the storage used by the one or more databases is allocated from a reserve storage device.

10. The computing system of claim 1, wherein the one or more databases are stored in one or more storage devices comprising a reserve storage device.

11. The computing system of claim 1, wherein the peak storage usage threshold is greater than the average storage usage threshold.

12. The computing system of claim 1, wherein the memory stores additional computer-readable instructions that, when executed by the one or more processors, further cause the computing system to:

determine, based on inputting the database state data into the one or more machine learning models, the average storage usage threshold for each of the one or more databases.

13. The computing system of claim 1, wherein the memory stores additional computer-readable instructions that, when executed by the one or more processors, further cause the computing system to:

determine, based on inputting the database state data into the one or more machine learning models, the peak storage usage threshold for each of the one or more databases.

14. A method of deallocating overallocated storage, the method comprising:

retrieving, by a computing device comprising one or more processors, database state data comprising an indication of a state of each of one or more databases, wherein the database state data comprises an indication of an amount of data currently used by each of the one or more databases;

retrieving, by the computing device, an average storage usage threshold for each of the one or more databases, wherein the average storage usage threshold for each of the one or more databases indicates an average amount of storage used by each of the one or more databases;

retrieving, by the computing device, a peak storage usage threshold for each of the one or more databases, wherein the peak storage usage threshold for each of the one or more databases indicates an amount of storage that is allocatable without causing an abnormal termination;

determining, by the computing device, based on inputting the database state data, the average storage usage threshold, and the peak storage usage threshold, into one or more machine learning models, an amount of overallocated storage to deallocate from each of the one or more databases; and deallocating, by the computing device, the overallocated storage from the one or more databases.

15. The method of claim 14, further comprising:

determining, by the computing device, based on inputting the database state data, the average storage usage threshold, and the peak storage usage threshold, into one or more machine learning models, an amount of underallocated storage for each of the one or more databases, wherein the amount of underallocated storage comprises an amount of data within a predetermined amount of the peak storage usage threshold for each of the one or more databases;

determining, by the computing device, based on inputting the amount of underallocated data into the one or more machine learning models, an amount of additional storage to add to each of the one or more databases; and allocating, by the computing device, the additional storage to each of the one or more databases.

16. The method of claim 14, further comprising:

accessing, by the computing device, training data comprising a plurality of historical states of a plurality of training databases, wherein the plurality of historical states comprise historical average storage usage training thresholds and historical peak storage usage training thresholds;

generating, by the computing device, based on inputting the training data into the one or more machine learning models, a plurality of storage overallocations;

determining, by the computing device, a similarity between the plurality of storage overallocations and a plurality of ground-truth storage overallocations;

generating, by the computing device, based on the similarity between the plurality of storage overallocations and the plurality of ground-truth storage overallocations, a storage overallocation prediction accuracy of the one or more machine learning models; and adjusting, by the computing device, a weighting of one or more parameters of the one or more machine learning models based on the storage overallocation prediction accuracy.

17. The method of claim 14, further comprising:

allocating, by the computing device, the overallocated storage to a reserve storage device.

18. The method of claim 14, further comprising:

determining, by the computing device, based on inputting the database state data into the one or more machine learning models, the average storage usage threshold for each of the one or more databases.

19. The method of claim 14, further comprising:

determining, by the computing device, based on inputting the database state data into the one or more machine learning models, the peak storage usage threshold for each of the one or more databases.

20. One or more non-transitory computer-readable comprising instructions that, when executed by a computing platform comprising at least one processor, a communication interface, and memory, cause the computing platform to:

retrieve database state data comprising an indication of a state of each of one or more databases, wherein the database state data comprises an indication of an amount of data currently used by each of the one or more databases;

retrieve an average storage usage threshold for each of the one or more databases, wherein the average storage usage threshold for each of the one or more databases indicates an average amount of storage used by each of the one or more databases;

retrieve a peak storage usage threshold for each of the one or more databases, wherein the peak storage usage threshold for each of the one or more databases indicates an amount of storage that is allocatable without causing an abnormal termination;

determine, based on inputting the database state data, the average storage usage threshold, and the peak storage usage threshold, into one or more machine learning models, an amount of overallocated storage to deallocate from each of the one or more databases; and deallocate the overallocated storage from the one or more databases.

\* \* \* \* \*